(12) United States Patent
Wang et al.

(10) Patent No.: US 12,108,398 B2
(45) Date of Patent: Oct. 1, 2024

(54) SIDELINK CONFIGURED GRANT SKIPPING

(71) Applicant: QUALCOMM Incorporated, San Diego, CA (US)

(72) Inventors: Xiaojie Wang, Hillsborough, NJ (US); Junyi Li, Fairless Hills, PA (US); Piyush Gupta, Bridgewater, NJ (US)

(73) Assignee: QUALCOMM Incorporated, San Diego, CA (US)

(*) Notice: Subject to any disclaimer, the term of this patent is extended or adjusted under 35 U.S.C. 154(b) by 467 days.

(21) Appl. No.: 17/560,506

(22) Filed: Dec. 23, 2021

(65) Prior Publication Data

US 2023/0209545 A1 Jun. 29, 2023

(51) Int. Cl.
*H04W 72/20* (2023.01)
(52) U.S. Cl.
CPC .................................. *H04W 72/20* (2023.01)
(58) Field of Classification Search
CPC .... H04W 72/20; H04W 72/40; H04W 72/115
See application file for complete search history.

(56) References Cited

U.S. PATENT DOCUMENTS

| | | | | |
|---|---|---|---|---|
| 2023/0098631 A1* | 3/2023 | Lee | ........................ | H04W 72/56 370/329 |
| 2023/0254889 A1* | 8/2023 | Liu | ........................ | H04W 72/40 370/329 |
| 2024/0129936 A1* | 4/2024 | Ganesan | ............... | H04W 72/40 |

\* cited by examiner

*Primary Examiner* — Eric Myers
(74) *Attorney, Agent, or Firm* — Holland & Hart / Qualcomm

(57) ABSTRACT

Methods, systems, and devices for sidelink configured grant skipping are described. In some examples, a first user equipment (UE) may receive, from a base station, an indication of periodic data resources for a plurality of sidelink data transmissions and an indication of negative scheduling request resources for the first UE to report a skipped sidelink data transmission associated with the plurality of sidelink data transmissions. In some examples, the first UE may transmit, to a second UE, an indication of the skipped sidelink data transmission and may transmit, to a base station, a negative scheduling request using the negative scheduling request resources, where the negative scheduling request may report the skipped data transmissions associated with the plurality of sidelink data transmissions.

30 Claims, 18 Drawing Sheets

SIDELINK CONFIGURED GRANT SKIPPING

FIELD OF TECHNOLOGY

The following relates to wireless communications, including sidelink configured grant skipping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may use configured grants to schedule sidelink communications. In some examples, a sidelink connection may support periodic traffic that may exhibit jitter for one or more reasons. For example, jitter may be introduced due to a misalignment of an upper layer traffic periodicity and a physical resource periodicity.

SUMMARY

The described techniques relate to improved methods, systems, devices, and apparatuses that support sidelink configured grant skipping. In some examples, a base station may transmit a configured grant to a first UE for sidelink communications between the first UE and a second UE. In some examples, the base station may configure the first UE to transmit a negative scheduling request for skipping one or more sidelink transmissions to the second UE. As such, the first UE may skip one or more sidelink transmissions and may inform the base station of such skipping by transmitting the negative scheduling request. In some examples, the first UE may transmit a negative sidelink control information (SCI) to the second UE to inform the second UE of the one or more skipped sidelink transmissions. In such examples, the second UE may decode the negative SCI and may skip decoding of the indicated sidelink transmissions.

A method for wireless communication at a first UE is described. The method may include receiving, from a base station, an indication of periodic data resources for a set of multiple sidelink data transmissions and an indication of negative scheduling request resources for the UE to report a skipped sidelink data transmission associated with the set of multiple sidelink data transmissions, transmitting, to a second UE, an indication of the skipped sidelink data transmission, and transmitting, to the base station, a negative scheduling request using the negative scheduling request resources, where the negative scheduling request reports the skipped data transmission associated with the set of multiple sidelink data transmissions.

An apparatus for wireless communication at a first UE is described. The apparatus may include a processor, memory coupled with the processor, and instructions stored in the memory. The instructions may be executable by the processor to cause the apparatus to receive, from a base station, an indication of periodic data resources for a set of multiple sidelink data transmissions and an indication of negative scheduling request resources for the UE to report a skipped sidelink data transmission associated with the set of multiple sidelink data transmissions, transmit, to a second UE, an indication of the skipped sidelink data transmission, and transmit, to the base station, a negative scheduling request using the negative scheduling request resources, where the negative scheduling request reports the skipped data transmission associated with the set of multiple sidelink data transmissions.

Another apparatus for wireless communication at a first UE is described. The apparatus may include means for receiving, from a base station, an indication of periodic data resources for a set of multiple sidelink data transmissions and an indication of negative scheduling request resources for the UE to report a skipped sidelink data transmission associated with the set of multiple sidelink data transmissions, means for transmitting, to a second UE, an indication of the skipped sidelink data transmission, and means for transmitting, to the base station, a negative scheduling request using the negative scheduling request resources, where the negative scheduling request reports the skipped data transmission associated with the set of multiple sidelink data transmissions.

A non-transitory computer-readable medium storing code for wireless communication at a first UE is described. The code may include instructions executable by a processor to receive, from a base station, an indication of periodic data resources for a set of multiple sidelink data transmissions and an indication of negative scheduling request resources for the UE to report a skipped sidelink data transmission associated with the set of multiple sidelink data transmissions, transmit, to a second UE, an indication of the skipped sidelink data transmission, and transmit, to the base station, a negative scheduling request using the negative scheduling request resources, where the negative scheduling request reports the skipped data transmission associated with the set of multiple sidelink data transmissions.

In some examples of the method, apparatuses, and non-transitory computer-readable medium described herein, receiving the indication of the negative scheduling request resources may include operations, features, means, or instructions for receiving, from the base station, an indication of a number of symbols between the negative scheduling request resource and the skipped sidelink data transmission of the set of multiple sidelink data transmissions.

In some examples of the method, apparatuses, and non-transitory computer-readable medium described herein, receiving the indication of the negative scheduling request resources may include operations, features, means, or instructions for receiving, from the base station, an indication of a periodicity associated with the negative scheduling request resources.

In some examples of the method, apparatuses, and non-transitory computer-readable medium described herein, the periodicity associated with the negative scheduling request resources may be an integer multiple of a periodicity associated with the sidelink data transmissions.

In some examples of the method, apparatuses, and non-transitory computer-readable medium described herein, the negative scheduling request specifies a set of multiple skipped data transmissions and a numerical quantity of the set of multiple skipped data transmissions may be based on a periodicity associated with the sidelink data transmissions.

In some examples of the method, apparatuses, and non-transitory computer-readable medium described herein, receiving the indication of the negative scheduling request resources may include operations, features, means, or instructions for receiving, from the base station, an indication of a physical uplink control channel (PUCCH) resource for transmitting an acknowledgement or a negative acknowledgement of one or more sidelink data transmissions of the set of multiple sidelink data transmissions.

In some examples of the method, apparatuses, and non-transitory computer-readable medium described herein, transmitting the negative scheduling request may include operations, features, means, or instructions for multiplexing the negative scheduling request with the acknowledgement or the negative acknowledgement of the one or more sidelink data transmissions in the PUCCH resource.

In some examples of the method, apparatuses, and non-transitory computer-readable medium described herein, multiplexing the negative scheduling request with the acknowledgment or the negative acknowledgment of the one or more sidelink data transmissions may include operations, features, means, or instructions for transmitting a PUCCH payload in the PUCCH resource, the PUCCH payload including a first number of bits for the acknowledgement or the negative acknowledgement and a second number of bits for a sidelink data transmission skipping indication.

In some examples of the method, apparatuses, and non-transitory computer-readable medium described herein, the indication of the skipped sidelink data transmission further indicates a skipping of one or more additional sidelink data transmissions subsequent to the skipped sidelink data transmission.

In some examples of the method, apparatuses, and non-transitory computer-readable medium described herein, the indication of the skipped sidelink data transmission indicates a skipping pattern for a group of sidelink data transmissions of the set of multiple sidelink data transmissions.

In some examples of the method, apparatuses, and non-transitory computer-readable medium described herein, and the method, apparatuses, and non-transitory computer-readable medium may include further operations, features, means, or instructions for SCI, a sidelink medium access control (MAC) control element (CE) message, radio resource control (RRC) signaling, or a combination thereof.

In some examples of the method, apparatuses, and non-transitory computer-readable medium described herein, the indication of the skipped sidelink data transmission includes stage one SCI, stage two SCI, or both.

A method for wireless communication at a base station is described. The method may include transmitting, to a UE, an indication of periodic data resources for a set of multiple sidelink data transmissions and an indication of negative scheduling request resources for the UE to report a skipped sidelink data transmission associated with the sidelink data transmissions and receiving, from the UE, a negative scheduling request using the negative scheduling resources, where the negative scheduling request reports the skipped data transmission associated with the set of multiple sidelink data transmissions.

An apparatus for wireless communication at a base station is described. The apparatus may include a processor, memory coupled with the processor, and instructions stored in the memory. The instructions may be executable by the processor to cause the apparatus to transmit, to a UE, an indication of periodic data resources for a set of multiple sidelink data transmissions and an indication of negative scheduling request resources for the UE to report a skipped sidelink data transmission associated with the sidelink data transmissions and receive, from the UE, a negative scheduling request using the negative scheduling resources, where the negative scheduling request reports the skipped data transmission associated with the set of multiple sidelink data transmissions.

Another apparatus for wireless communication at a base station is described. The apparatus may include means for transmitting, to a UE, an indication of periodic data resources for a set of multiple sidelink data transmissions and an indication of negative scheduling request resources for the UE to report a skipped sidelink data transmission associated with the sidelink data transmissions and means for receiving, from the UE, a negative scheduling request using the negative scheduling resources, where the negative scheduling request reports the skipped data transmission associated with the set of multiple sidelink data transmissions.

A non-transitory computer-readable medium storing code for wireless communication at a base station is described. The code may include instructions executable by a processor to transmit, to a UE, an indication of periodic data resources for a set of multiple sidelink data transmissions and an indication of negative scheduling request resources for the UE to report a skipped sidelink data transmission associated with the sidelink data transmissions and receive, from the UE, a negative scheduling request using the negative scheduling resources, where the negative scheduling request reports the skipped data transmission associated with the set of multiple sidelink data transmissions.

In some examples of the method, apparatuses, and non-transitory computer-readable medium described herein, transmitting the indication of the negative scheduling request resources may include operations, features, means, or instructions for transmitting, to the UE, an indication of a number of symbols between a negative scheduling request resource and a corresponding sidelink data transmission.

In some examples of the method, apparatuses, and non-transitory computer-readable medium described herein, the number of symbols between the negative scheduling request resource and the corresponding sidelink data transmission corresponds to a decoding time at the base station associated with processing the negative scheduling request.

In some examples of the method, apparatuses, and non-transitory computer-readable medium described herein, transmitting the indication of the negative scheduling request resources may include operations, features, means, or instructions for transmitting, to the UE, an indication of a periodicity associated with negative scheduling request resources.

In some examples of the method, apparatuses, and non-transitory computer-readable medium described herein, the periodicity associated with negative scheduling resources request may be an integer multiple of a periodicity associated with sidelink data transmissions.

In some examples of the method, apparatuses, and non-transitory computer-readable medium described herein, the negative scheduling request specifies a set of multiple skipped data transmissions and a numerical quantity of the set of multiple skipped data transmissions may be based on a periodicity associated with the sidelink data transmissions.

In some examples of the method, apparatuses, and non-transitory computer-readable medium described herein, transmitting the indication of the negative scheduling request resources may include operations, features, means, or instructions for transmitting, to the UE, an indication of a PUCCH resource for transmitting an acknowledgement or a negative acknowledgement of one or more sidelink data transmissions of the set of multiple sidelink data transmissions.

In some examples of the method, apparatuses, and non-transitory computer-readable medium described herein, receiving the negative scheduling request may include operations, features, means, or instructions for multiplexing the negative scheduling request with the acknowledgement or the negative acknowledgement of the one or more sidelink data transmissions in the PUCCH resource.

In some examples of the method, apparatuses, and non-transitory computer-readable medium described herein, multiplexing the negative scheduling request with the acknowledgement or the negative acknowledgement of the one or more sidelink data transmissions may include operations, features, means, or instructions for receiving a PUCCH payload in the PUCCH resource, the PUCCH payload including a first number of bits for the acknowledgement or the negative acknowledgement and a second number of bits for a sidelink data transmission skipping indication.

Some examples of the method, apparatuses, and non-transitory computer-readable medium described herein may further include operations, features, means, or instructions for decoding the negative scheduling request and scheduling other transmissions during instances corresponding to skipped data transmissions.

DETAILED DESCRIPTION

Some wireless communications systems may use configured grants to schedule sidelink communications. In some examples, a sidelink connection may support periodic traffic that may exhibit jitter for one or more reasons. For example, jitter may be introduced due to a misalignment of an upper layer traffic periodicity and a physical resource periodicity. In other words, a first UE may communicate with a second UE using periodic sidelink transmissions, where a control layer for a sidelink communication may be misaligned with a data channel (e.g., misaligned in one or more frame timings), resulting in signal jitter. If such jitter happens and no transmission occurs on provisioned resources, there may be a waste of communication resources. Further, in cases where the second UE attempts to decode messages where transmissions fail to occur, the second UE may experience a lower power efficiency.

According to the techniques of this disclosure, wireless communications systems may support signaling for sidelink configured grant skipping. In some examples, a base station may transmit a configured grant configuration to the first UE configuring sidelink communications between the first UE and the second UE. In some examples, the base station may configure the first UE to transmit a negative scheduling request for skipping one or more sidelink transmissions to the second UE. As such, the first UE may determine to skip one or more sidelink transmissions and may inform the base station of such skipping by transmitting the negative scheduling request. In such examples, the base station may receive the negative scheduling request and may decode the negative scheduling request content. In some examples, the base station may schedule other transmissions on the configured grant instances where transmissions are skipped (e.g., should the transmission timeline allow). In some examples, the first UE may transmit a negative sidelink control information (SCI) to the second UE to inform the second UE of the one or more skipped sidelink transmissions. In such examples, the second UE may decode the negative SCI and may skip decoding of the indicated sidelink transmissions.

Aspects of the disclosure are initially described in the context of wireless communications systems. Aspects of the disclosure are then described in the context of resource diagrams and process flows. Aspects of the disclosure are further illustrated by and described with reference to apparatus diagrams, system diagrams, and flowcharts that relate to sidelink configured grant skipping.

Figure 1:
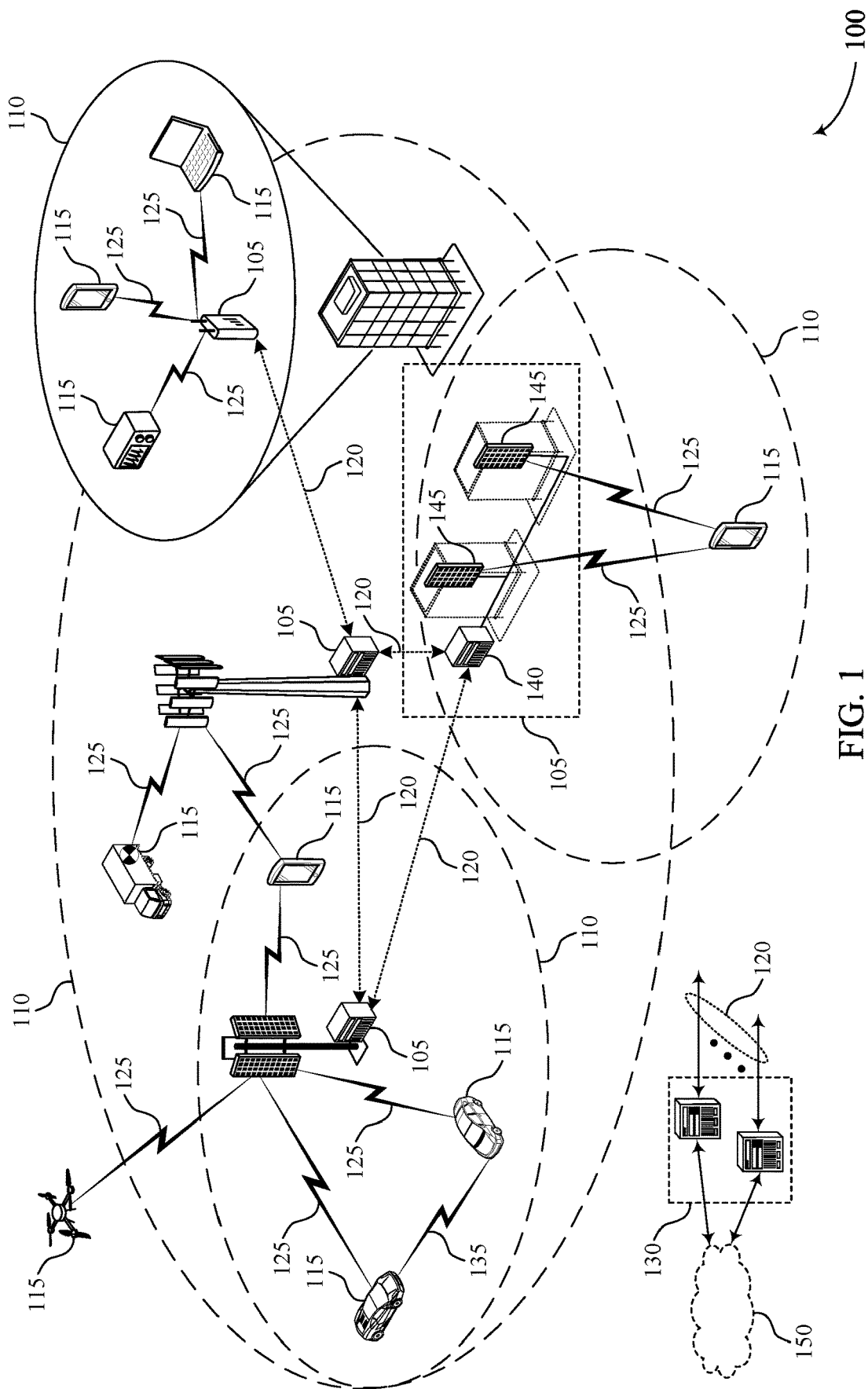
FIG. 1 illustrates an example of a wireless communications system that supports sidelink configured grant skipping in accordance with aspects of the present disclosure.

FIG. 1 illustrates an example of a wireless communications system 100 that supports sidelink configured grant skipping in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may use configured grants to schedule sidelink communications. In some examples, a sidelink connection may support periodic traffic that may exhibit jitter for one or more reasons. For example, jitter may be introduced due to a misalignment of an upper layer traffic periodicity and a physical resource periodicity. In other words, a first UE 115 may communicate with a second UE 115 using periodic sidelink transmissions, where a control layer for a sidelink communication may be misaligned with a data channel (e.g., misaligned in one or more frame timings), resulting in signal jitter. If such jitter happens and no transmission occurs on provisioned resources, there may be a waste of communication resources. Further, in cases where the second UE 115 attempts to decode messages where transmissions fail to occur, the second UE 115 may experience a reduction in power efficiency.

In some cases, wireless communications systems may support signaling for sidelink configured grant skipping. For example, a base station 105 may transmit a configured grant configuration to the first UE 115 configuring sidelink communications between the first UE 115 and the second UE 115. In some examples, the base station 105 may configure the first UE 115 to transmit a negative scheduling request for skipping one or more sidelink transmissions to the second UE 115. As such, the first UE 115 may determine to skip one or more sidelink transmissions and may inform the base station 105 of such skipping by transmitting the negative scheduling request. In such examples, the base station 105 may receive the negative scheduling request and may decode the negative scheduling request content. In some examples, the base station 105 may schedule other transmissions on the configured grant instances where transmissions are skipped (e.g., should the transmission timeline allow). In some examples, the first UE 115 may transmit a negative sidelink control information (SCI) to the second UE 115 to inform the second UE 115 of the one or more skipped sidelink transmissions. In such examples, the second UE 115 may decode the negative SCI and may skip decoding of the indicated sidelink transmissions.

Figure 2:
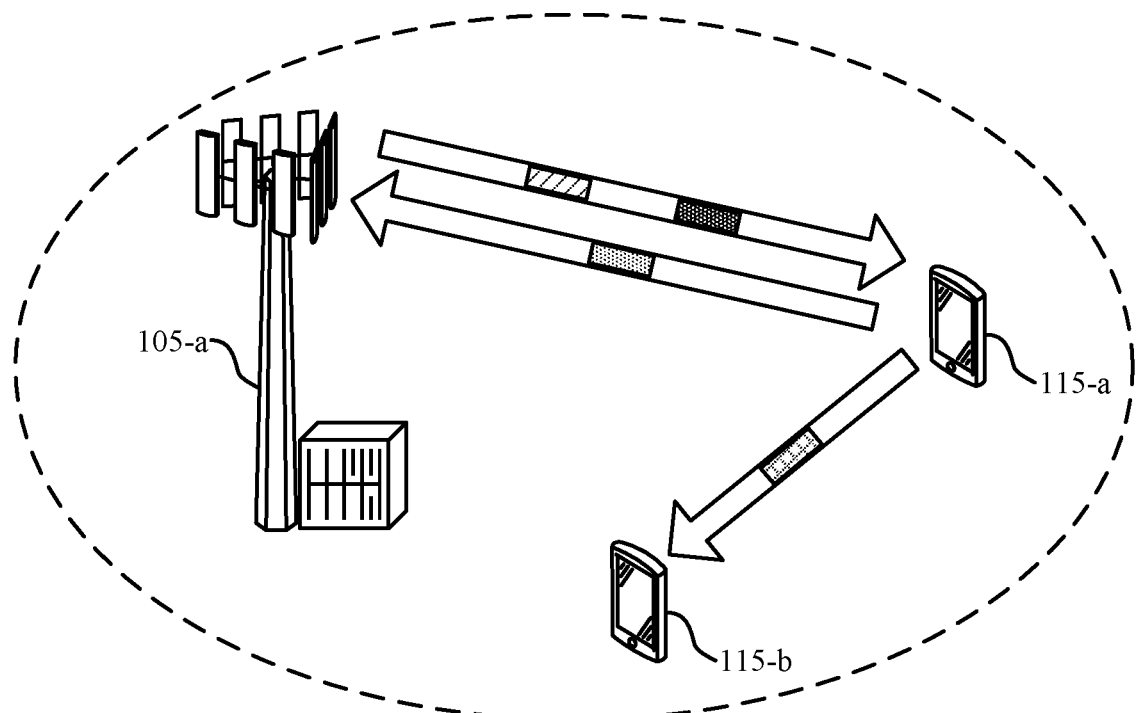
FIG. 2 illustrates an example of a wireless communications system that supports sidelink configured grant skipping in accordance with aspects of the present disclosure.
Figure 2:
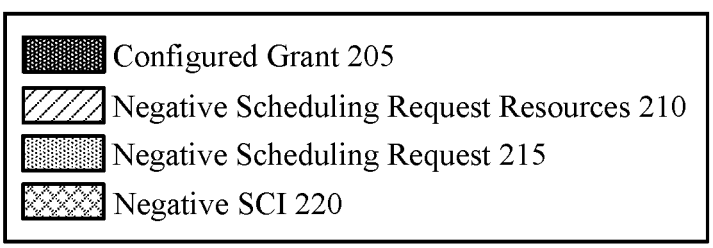

FIG. 2 illustrates an example of a wireless communications system 200 that supports sidelink configured grant skipping in accordance with aspects of the present disclosure. The wireless communications system 200 may implement or be implemented by aspects of the wireless communications system 100. For example, wireless communications system 200 may include a base station 105-a, a UE 115-a, and a UE 115-b which may be examples of corresponding devices as described with reference to FIG. 1. In some examples, the UE 115-a and the base station 105-a may exchange signaling supporting sidelink configured grant skipping, where the UE 115-a, may be configured to skip one or more sidelink data channel instances associated with communications with UE 115-b.

Some wireless communications systems, such as wireless communications system 200, may use configured grants to schedule sidelink communications. In some examples, NR sidelink may support periodic traffic. For example, the UE 115-a and the UE 115-b may communicate with one another using periodic sidelink communications. In some examples, the wireless devices in wireless communications system 200 may use configured grants to schedule periodic physical sidelink shared channel (PSSCH) transmissions. For example, the base station 105-a may transmit a configured grant 205 to the UE 115-a, scheduling periodic PSSCH transmissions between the UE 115-a and the UE 115-b.

In some cases, such PSSCH transmissions may be activated by the base station 105-a. In some examples, a type 1 configured grant may be activated with RRC signaling and a type 2 configured grant may be activated with downlink control information (DCI) signaling. For example, the base station 105-a may configure the UE 115-a with type 1 configured grant and the base station 105-a may transmit RRC signaling to the UE 115-a to activate PSSCH transmissions between the UE 115-a and the UE 115-b. For example, the base station 105-a may configure the UE 115-a with type 2 configured grant and the base station 105-a may transmit DCI signaling to the UE 115-a to activate PSSCH transmissions between the UE 115-a and the UE 115-b.

In some cases, periodic sidelink traffic may be suitable for industrial IoT (IIoT) use cases with URLLC traffic. For example, the UE 115-a and the UE 115-b may be in an IIoT communications system, where communicating using periodic sidelink traffic may be acceptable for high priority communications. In some examples, periodic sidelink transmissions may be activated using a single physical downlink control channel (PDCCH) message (e.g., in type 2 configured grant). For example, in cases where the base station 105-a configures the UE 115-a using type 2 configured grant, the base station 105-a may transmit a single DCI to the UE 115-a to activate periodic sidelink transmissions between the UE 115-a and the UE 115-b. In such cases, activating periodic sidelink transmissions may reduce PDCCH or DCI overhead, for example, the base station 105-a may activate periodic sidelink transmissions using less DCI as compared to activating aperiodic sidelink transmissions. In some examples, periodic sidelink traffic may support dynamic scheduling for retransmissions. For example, the base station 105-a may transmit dynamic signaling, to the UE 115-a, scheduling the UE 115-a to retransmit a sidelink transmission that the UE 115-b may have failed to receive or decode.

In some cases, a sidelink configured grant for a UE, such as UE 115-a may be configured by RRC signaling. For example, the base station 105-a may transmit an RRC signal to the UE 115-a, the RRC signal containing a configured grant associated with a configured grant period and a HARQ offset (e.g., for the UE 115-a and the UE 115-b to exchange acknowledgment/negative acknowledgment signaling). In such cases, the base station 105-a may transmit DCI to the UE 115-a to activate, de-active, or reactivate configured grant periodic transmissions between the UE 115-a and the UE 115-b in accordance with the previously received configured grant. In some cases, such DCI may provide a time gap (e.g., between periodic transmissions, between the activation DCI and the activation of the periodic transmissions), among other transmission parameters. Some sidelink configured grant transmissions may be introduced with reduced periodicity, multiple sidelink configured grant configurations (e.g., up to eight configurations), among other configuration examples.

Some wireless communications systems may support specific characteristics, and such communications systems may utilize sidelink traffic. For example, in IIoT, sidelink may enable direct programmable logic controller (PLC) and SAs communications. In such examples, wireless PLC may be used for flexible and relatively simple deployment. Wireless PLC may be capable of controlling one or more SAs. For example, a PLC may be capable of controlling 20-50 SAs. Communications involving such devices may have relatively tight latency (e.g., a 1-2 ms latency threshold) as well as an ultra-reliability threshold (e.g., having an error rate of less than $10^{-6}$). Such communications using a network node, such as base station 105-a, may include multiple OTAs, which may affect latency and reliability. IIoT communications may include one or more characteristics. For example, IIoT traffic may be deterministic and may include small data packet sizes (e.g., 32-256 Bytes). As such, individual communication bandwidths in IIoT systems may be relatively small (e.g., 2 RBs may be sufficient in some cases).

In some cases, SAs may be constrained in terms of bandwidth and processing power. For example, UE 115-a and UE 115-b may be SAs, communicating with one another using a relatively small communication bandwidth (e.g., 2 RBs). In some cases, an overall bandwidth for IIoT communications may be relatively large with dedicated frequency bands, unlicensed bands, or a combination thereof. In such cases, SAs may refrain from monitoring for and detecting all transmissions in the IIoT communications system. In some cases, sidelink communications may be implemented in IIoT communications systems. For example, the UE 115-*a* may communicate physical sidelink control channel (PSCCH) to the UE 115-*b* in accordance with the one or more IIoT characteristics. In some cases, IIoT communications systems may have challenging radio frequency environments with blockages and interference. For example, IIoT communications systems may include many devices communicating with one another, introducing both physical and signal interference, such that the one or more IIoT characteristics may provide for sufficient communications.

In some cases, periodic traffic arrival may exhibit jitter for one or more reasons. For example, devices communicating using periodic sidelink transmissions may experience signal jitter for specific reasons. In some cases, jitter may be introduced due to a misalignment of an upper layer traffic periodicity and a physical resource periodicity. For example, the UE 115-*a* may communicate with the UE 115-*b* using periodic sidelink transmissions, where a control layer for a sidelink communication may be misaligned with a data channel (e.g., misaligned in one or more frame timings), resulting in signal jitter. In some examples, the sidelink traffic itself may not be perfectly periodic, may have sporadic "on" and "off" states, or a combination thereof, which may further impart jitter in sidelink signaling. Additionally, configured grant resources may be overprovisioned to support such periodic traffic, resulting in signal jitter. For example, an upper layer traffic period may be configured as 0.9 milliseconds (ms) where a physical layer configured grant period may be configured with 0.5 ms due to a slot or frame structure. In such examples, there may be jitter due to processing time and traffic generation for the communication layers. such that traffic may be unavailable at some configured grant instances. That is, a misalignment of an upper layer and a physical layer (e.g., due to overprovisioning of communication layer periods) may result in signal jitter. If such jitter happens and no transmission occurs on provisioned resources, there may be a waste of communication resources. Further, in cases where the UE 115-*a* attempts to decode messages where transmissions fail to occur, the UE 115-*a* may experience a waste of power.

In some cases, wireless communications system 200 may support signaling for sidelink configured grant skipping. In some examples, the base station 105-*a* may transmit configured grant 205 to the UE 115-*a* configuring sidelink configured grant at the UE 115-*a*. In such examples, the base station 105-*a* may activate such sidelink configured grant between the UE 115-*a* and the UE 115-*b* through transmission of a control message such as a DCI. In some examples, the base station 105-*a* may configure the UE 115-*a* to transmit a negative scheduling request 215 for PSSCH skipping between the UE 115-*a* and the UE 115-*b* in accordance with skipping options (e.g., different options for monitoring occasions, different options for waveforms, different options for scheduling request resources) as described with reference to FIGS. 3 and 4. For example, the base station 105-*a* may transmit negative scheduling request resources 210 to the UE 115-*a*, configuring the UE 115-*a* with resources for the UE 115-*a* to transmit the negative scheduling request 215. In some examples, the UE 115-*a* may transmit the negative scheduling request 215 on the configured resources (e.g., configured in the negative scheduling request resources 210) for the UE 115-*a* to inform the base station 105-*a* of one or more skipped PSSCH instances. That is, the UE 115-*a* may determine to skip one or more PSSCH instances and may inform the base station 105-*a* of such skipping by transmitting the negative scheduling request 215. In such examples, the base station 105-*a* may receive the negative scheduling request 215 and may decode the negative scheduling request 215 content. In some examples, the base station 105-*a* may schedule other transmissions on the configured grant instances where transmissions are skipped (e.g., should the transmission timeline allow).

In some examples, the UE 115-*a* may transmit a negative SCI 220 to the UE 115-*b* to inform the UE 115-*b* of the one or more skipped PSSCH instances. In such examples, the UE 115-*b* may decode the negative SCI 220 and may skip decoding of the indicated PSSCHs.

Configuring the UE 115-*a* to skip PSSCH instances and to inform the base station 105-*a* and the UE 115-*b* of the skipped PSSCH instances may mitigate overprovisioning of sidelink communications, resulting in more efficient communication resource scheduling, reduced signal jitter, among other examples.

Figure 3:
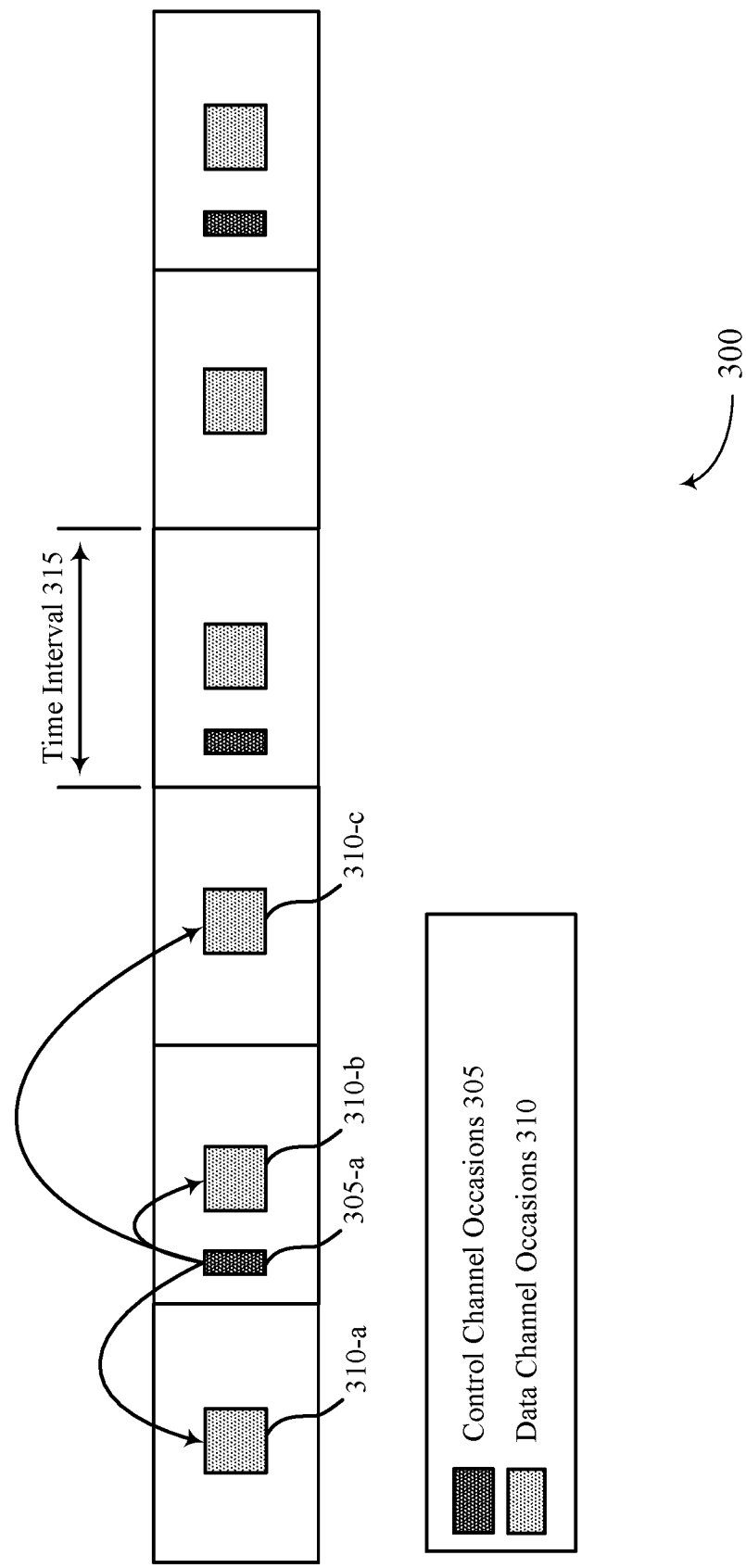
FIG. 3 illustrates an example of a resource diagram that supports sidelink configured grant skipping in accordance with aspects of the present disclosure.

FIG. 3 illustrates an example of a resource diagram 300 that supports sidelink configured grant skipping in accordance with aspects of the present disclosure. In some examples, the resource diagram may be implemented by aspects of wireless communications system 100 or wireless communications system 200. In this example, a base station may configure a first UE to indicate, to the base station, one or more skipped PSSCH transmissions.

In some examples, resource diagram 300 may support a negative scheduling request configuration. In such examples, the base station may configure the first UE with one or more negative scheduling request transmission occasions (e.g., such as negative scheduling request resources 210 as described with reference to FIG. 2), considering one or more activated sidelink configured grant configurations and a processing time at the base station associated with decoding a negative scheduling request (e.g., such as negative scheduling request 215 as described with reference to FIG. 2). For example, the base station may configure the UE to transmit negative scheduling requests on one or more control channel occasions 305 considering, or based at least in part on, the data channel occasions 310. The first UE may identify the negative scheduling request transmission occasions and may report, to the base station, one or more skipped data channel occasions 310. For example, the first UE may transmit, within control channel occasion 305-*a*, the negative scheduling request to the base station indicating that the data channel occasion 310-*b* may be skipped.

In some examples, one or more negative scheduling request transmission occasions may be configured to be at least a number of symbols before PSSCH occasions where the number of symbols may be associated with a decoding time at the base station. For example, the base station may configure control channel occasions 305 a number of symbols before data channel occasions 310, where the number of symbols may be a decoding time associated with the base station decoding negative scheduling requests. In some examples, the number of symbols may be communicated between the base station and the first UE and may be defined for each subcarrier spacing (SCS) and format of the negative scheduling request. In some examples, a number of symbols may be defined for each SCS. For example if the negative scheduling request is configured with specific SCS, such as 15 kHz, 30 kHz, 120 kHz, the number of symbols may be configured as 4 symbols, 8 symbols, and 33 symbols, respectively (e.g., in accordance with base station 105-*a* decoding timing). In such examples, the processing time at the base station 105-*a* for the negative scheduling request may increase with increasing SCS. Further, the processing time may depend on a capability of the base station 105-a, or a capability class of the base station 105-a. For example, a class 1 base station 105-a may use 4 symbols for an SCS of 15 kHz while a class 2 base station 105-a may use 2 symbols for the same SCS. In some examples, the format of the negative scheduling request may refer to a payload size of the negative scheduling request and the waveform of the negative scheduling request. For example, the negative scheduling request may have a payload size of less than 2 bits, between 2 and 12 bits, or more than 12 bits. In such examples, the negative scheduling request may be transmitted using a sequence wave form (e.g., a Zadoff-Chu sequence) for payload sizes less than 2 bits, a QPSK waveform with short block-length error correction codes (ECCs) for payload sizes between 2 and 11 bits, a polar coding waveform with short cyclic redundancy check (CRC) (e.g., CRC with 5 bits) for payload sizes between 12 and 19 bits, and polar coding waveforms with large CRC (e.g., CRC with 11 bits) for payload sizes with 19 or more bits. In some cases, a periodicity of the negative scheduling request may be the same or a multiple of a sidelink configured grant periodicity. For example, the base station may schedule the control channel occasions 305 at the first UE to be the same periodicity as the data channel occasions 310 or a multiple (e.g., an integer multiple) of the periodicity of the data channel occasions 310. In the example of resource diagram 300, the base station may configure the control channel occasions 305 to occur once for every two time intervals 315 (e.g., symbols, slots).

In some examples, negative scheduling requests may be configured for each sidelink configured grant or jointly for all activated sidelink configured grants. That is, the first UE may be configured to transmit a negative scheduling request using a respective control channel occasion 305 for each data channel occasion 310 or may be configured to transmit a negative scheduling request using a control channel occasion 305 for all activated data channel occasions 310. In some examples, one negative scheduling request may indicate one or more skipped PSCCH instances depending on the periodicity of the sidelink configured grant configurations. For example, the first UE may transmit a negative scheduling request, to the base station, indicating that both data channel occasion 310-b and data channel occasion 310-c may be skipped. In some examples, negative scheduling requests may include sequence-based waveforms for quick decoding and may have relatively small payloads as compared to other control channel transmissions. For example, the first UE may transmit a negative scheduling request, to the base station during the control channel occasion 305-a, in accordance with a Zadoff-Chu sequence (e.g., with a phase shift).

In some examples, the first UE may be configured to transmit negative scheduling requests during control channel occasions 305 using physical uplink control channel (PUCCH) multiplexing. For example, the base station may configure the first UE with one or more sidelink configured grants (e.g., data channel occasions 310) along with a PUCCH resource that the first UE may use to indicate acknowledgment (ACK) or negative acknowledgment (NACK) of one or more PSSCH transmissions to the base station. In the example of resource diagram 300, the first UE may transmit, to the base station, a PUCCH during the control channel occasion 305-a indicating ACK or NACK associated with transmissions transmitted to, or received from, a second UE, during data channel occasion 310-a. In some examples, negative scheduling requests may be multiplexed with the ACK or NACK in the PUCCH. That is, the first UE may transmit both a negative scheduling request and an ACK or NACK to the base station during a control channel occasion 305 and on multiplexed PUCCH resources. In some examples, a PUCCH payload may include a number of bits for an ACK or a NACK and a number of bits for a PSSCH skipping indication. For example, the first UE may transmit a PUCCH message, to the base station, including a first number of bits for an ACK or a NACK of PSSCH transmissions and second number of bits for a negative scheduling request. In some examples, the number of bits for the PSSCH skipping indication may be configured by the base station for each PUCCH resource configuration (e.g., via RRC signaling). In other words, the base station may configure the first UE to use a number of PUCCH bits to transmit the negative scheduling request for each PUCCH resource instance.

Configuring UEs to transmit negative scheduling requests to inform serving base stations of skipped data channel occasions 310 may enable the base stations to schedule other transmissions during the skipped data channel occasions 310, resulting in enhanced coordination between devices, more efficient use of communication resources, among other examples.

Figure 4:
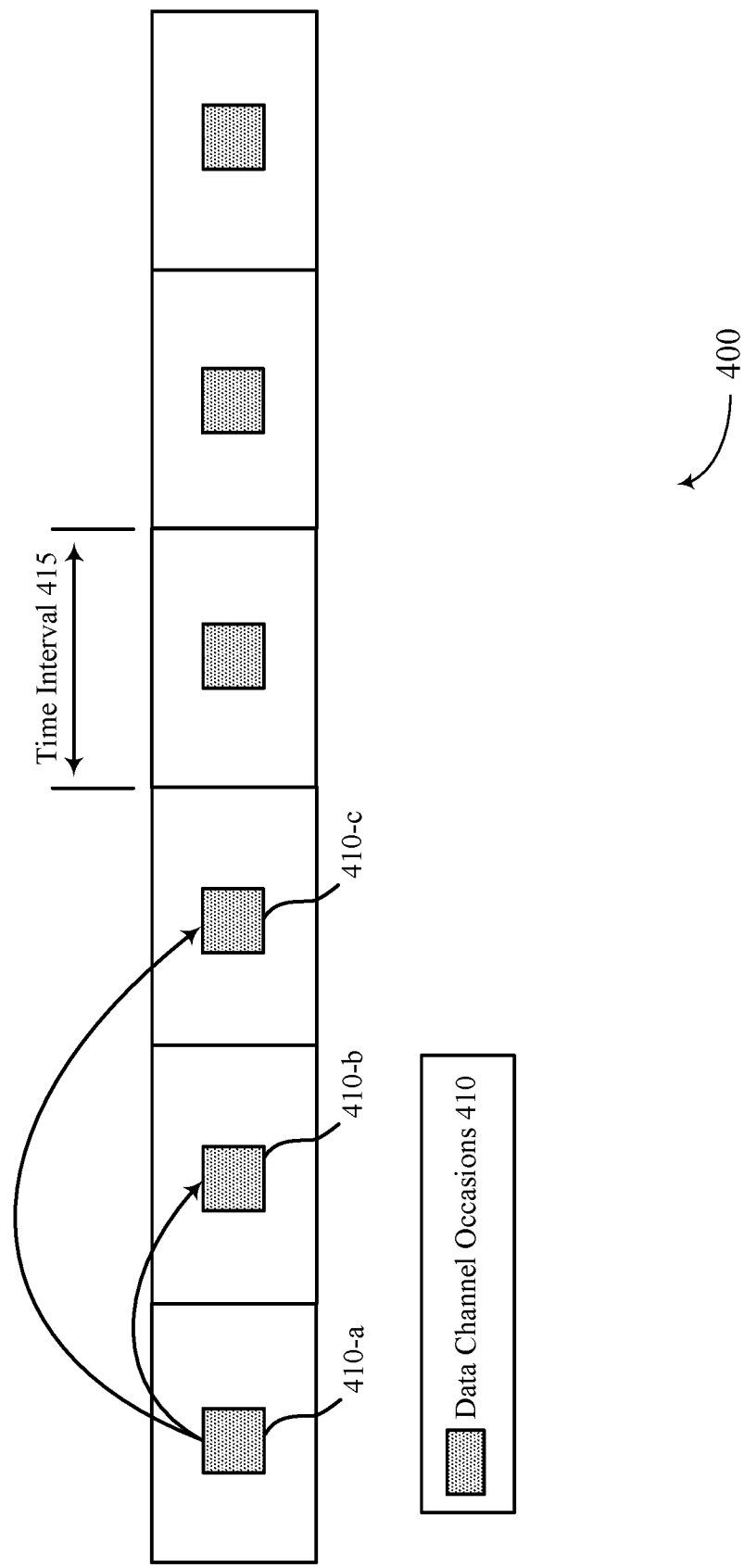
FIG. 4 illustrates an example of a resource diagram that supports sidelink configured grant skipping in accordance with aspects of the present disclosure.

FIG. 4 illustrates an example of a resource diagram 400 that supports sidelink configured grant skipping in accordance with aspects of the present disclosure. In some examples, the resource diagram may be implemented by aspects of wireless communications system 100 or wireless communications system 200. In this example, a first UE may transmit a negative SCI (e.g., such as negative SCI 220 as described with reference to FIG. 2) to a second UE, informing the second UE of one or more skipped data channel occasions 410.

In some examples, the first UE may transmit the negative SCI indication to the second UE using a sidelink MAC-CE, RRC signaling, or a combination thereof. For example, the first UE may transmit MAC-CE or RRC signaling in one configured grant PSSCH indicating skipping of one or more subsequent PSSCHs. In the example of resource diagram 400, the first UE may transmit a negative SCI indication to the second UE, during data channel occasion 410-a, the negative SCI indicating that the data channel occasion 410-b may be skipped and that the data channel occasion 410-c may not be skipped. In some examples, the MAC-CE or the RRC signaling may be periodic or semi-persistent with a bitmap indicating skipping of subsequent PSCCH occasions. For example, the first UE may transmit the negative SCI indication, to the second UE, including a bitmap that may indicate whether one or more subsequent data channel occasions 410 may be skipped.

In some examples, the negative SCI indication may indicate a number of skipped PSSCH occasions. For example, the negative SCI indication may indicate a number of consecutive skipped data channel occasions 410 or a number of skipped data channel occasions 410 in accordance with a configured skipping pattern. In some examples, RRC signaling may further indicate PSSCH group skipping. That is, the RRC signaling may include a first number of bits for indicating a first group of data channel occasions 410 (e.g., for a first time interval 415) to be skipped and may include a second number of bits for indicating a second group of data channel occasions 410 (e.g., for a second time interval 415) to be skipped. For example the RRC signaling may include one bit for indicating the second group of data channel occasions 410 to be skipped.

In some cases, the number of skipped PSSCH occasions and the group of data channel occasions 410 may be defined for each configured grant or jointly for all activated configured grants. That is, the number of skipped PSSCH occasions and the group of data channel occasions 410 may be defined for each individual configured grant or may be defined for all activated configured grants. Upon receiving the negative rSCI indication, the second UE may skip PSSCH decoding on the indicated resources. For example, the second UE may skip PSSCH decoding during data channel occasion 410-b, but not during data channel occasion 410-c. In some examples, the first UE may schedule the skipped PSSCH resources to other transmissions. For example, the first UE may schedule transmissions to the base station during the skipped data channel occasions 410.

In some examples, the first UE may transmit the negative SCI indication using different stage SCI messages. For example, the first UE may transmit the negative SCI as an SCI-2 or an SCI- to indicate PSSCH skipping. In such examples, the second UE may receive the negative SCI and may skip decoding the PSSCHs, switch to a transmission mode, or a combination thereof. In some examples, other UEs decoding the negative SCI indication may use the resources that the first UE indicated in the negative SCI indication for PSSCH skipping. For example, a third UE may decode the negative SCI in the data channel occasion 410-a and may communicate to one or more other sidelink devices during the data channel occasion 410-b based on the data channel occasion 410-b being skipped by the first UE.

Configuring UEs to transmit negative SCI to inform other UEs of skipped data channel occasions 410 may enable the UEs to schedule other transmissions during the skipped data channel occasions 410, resulting in enhanced coordination between devices, more efficient use of communication resources, among other examples.

Figure 5:
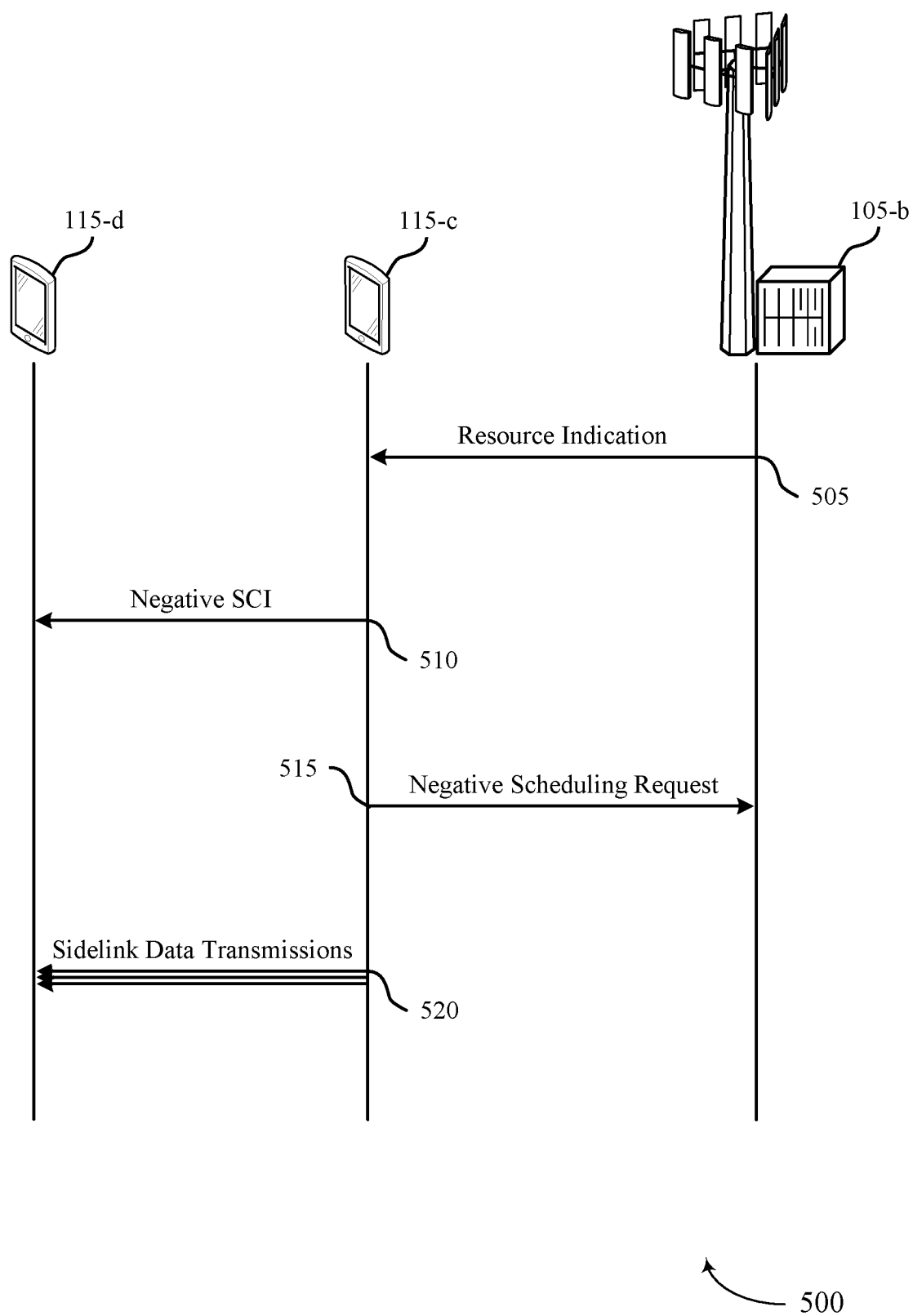
FIG. 5 illustrates an example of a process flow that supports sidelink configured grant skipping in accordance with aspects of the present disclosure.

FIG. 5 illustrates an example of a process flow 500 that supports sidelink configured grant skipping in accordance with aspects of the present disclosure. In some examples, the process flow 500 may implement aspects of wireless communications systems 100 or 200. For example, process flow 500 may include UE 115-c, UE 115-d, and base station 105-b, which may be examples of corresponding devices as described with reference to FIGS. 1 and 2. In some examples, the UE 115-c, the UE 115-d and the base station 105-b may exchange signaling with one another to dynamically configure sidelink configured grant skipping.

In the following description of the process flow 500, the operations may be performed (e.g., reported or provided) in a different order than the order shown, or the operations performed by the UE 115-c, the UE 115-d, and the base station 105-b may be performed in different orders or at different times. For example, specific operations also may be left out of the process flow 500, or other operations may be added to the process flow 500. Further, although some operations or signaling may be shown to occur at different times for discussion purposes, these operations may actually occur at the same time.

At 505, the base station 105-b may transmit, and the UE 115-c may receive, a resource indication. That is, the UE 115-c may receive, from the base station 105-b, an indication of periodic data resources for a plurality of sidelink data transmissions and an indication of negative scheduling request resources for the UE 115-c to report a skipped sidelink data transmission associated with the plurality of sidelink data transmissions. In some examples, receiving the indication of the negative scheduling request resources may include receiving, from the base station, an indication of a number of symbols between the negative scheduling request resource and the skipped sidelink data transmission of the plurality of sidelink data transmissions. In some examples, receiving the indication of the negative scheduling request resources may include receiving, from the base station, an indication of a periodicity associated with the negative scheduling request resources. In some cases, the periodicity associated with the negative scheduling request resources may be an integer multiple of a periodicity associated with the sidelink data transmissions.

In some examples, receiving the indication of the negative scheduling request resources may include receiving, from the base station, an indication of a PUCCH resource for transmitting an ACK or a NACK of one or more sidelink data transmissions of the plurality of sidelink data transmissions.

At 510, the UE 115-c may transmit, to the UE 115-d, an indication of the skipped sidelink data transmission. That is, the UE 115-c may transmit a negative SCI to the UE 115-d, indicating one or more skipped sidelink data transmissions. In some examples, the indication of the skipped sidelink data transmission further indicates a skipping of one or more additional sidelink data transmissions subsequent to the skipped sidelink data transmission. Additionally or alternatively, the indication of the skipped sidelink data transmission may indicate a skipping pattern (e.g., a bitmap) for a group of sidelink data transmissions of the plurality of sidelink data transmissions. In some examples, the indication of the skipped sidelink data transmission may include one or more of SCI, a sidelink MAC CE message, RRC signaling, or a combination thereof. Further, in some examples, the indication of the skipped sidelink data transmission may include stage one SCI, stage two SCI, or both.

At 515, the UE 115-c may transmit, and the base station 105-b may receive, a negative scheduling request using the negative scheduling request resources, where the negative scheduling request may report the skipped data transmission associated with the plurality of sidelink data transmissions. In some examples, the negative scheduling request specifies a plurality of skipped data transmissions, and a numerical quantity of the plurality of skipped data transmissions may be based at least in part on a periodicity associated with the sidelink data transmissions. In some examples, the UE 115-c may transmit the negative scheduling request by multiplexing the negative scheduling request with the acknowledgement or the negative acknowledgement of the one or more sidelink data transmissions in a PUCCH resource (e.g., the PUCCH resource provided in the indication of the negative scheduling request resources). In such examples, the UE 115-c may transmit a PUCCH payload in the PUCCH resource, the PUCCH payload including a first number of bits for the ACK or the NACK and a second number of bits for a sidelink data transmission skipping indication.

At 520, the UE 115-c may transit one or more sidelink data transmissions to the UE 115-d in accordance with the techniques as described herein, for example, skipping one or more of the sidelink data transmissions.

Figure 6:
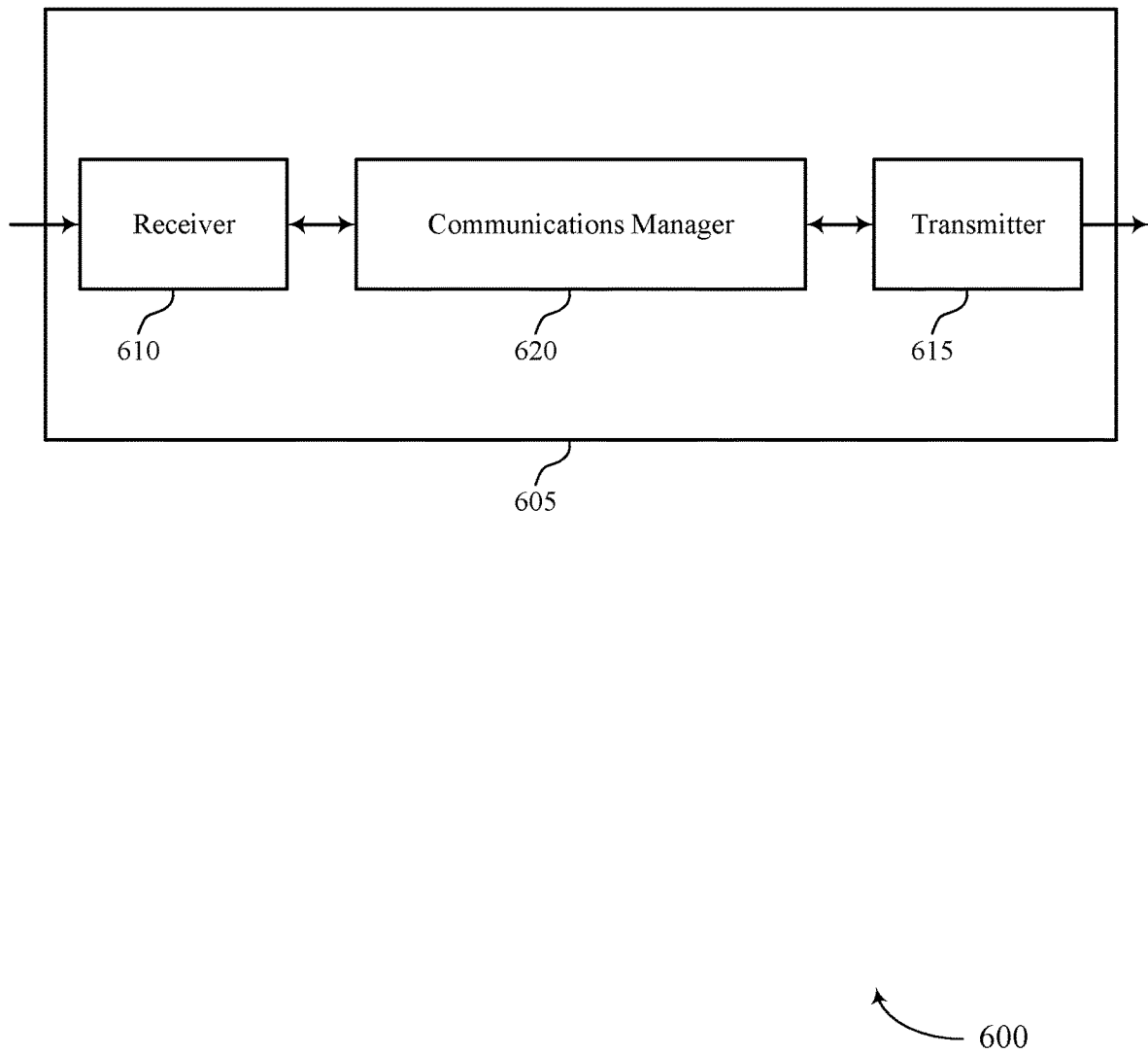
FIGS. 6 and 7 show block diagrams of devices that support sidelink configured grant skipping in accordance with aspects of the present disclosure.

FIG. 6 shows a block diagram 600 of a device 605 that supports sidelink configured grant skipping in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink configured grant skipping). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink configured grant skipping). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sidelink configured grant skipping as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for receiving, from a base station, an indication of periodic data resources for a set of multiple sidelink data transmissions and an indication of negative scheduling request resources for the UE to report a skipped sidelink data transmission associated with the set of multiple sidelink data transmissions. The communications manager 620 may be configured as or otherwise support a means for transmitting, to a second UE, an indication of the skipped sidelink data transmission. The communications manager 620 may be configured as or otherwise support a means for transmitting, to the base station, a negative scheduling request using the negative scheduling request resources, where the negative scheduling request reports the skipped data transmission associated with the set of multiple sidelink data transmissions.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for sidelink configured grant skipping, resulting in a mitigation of resource overprovisioning, reduced processing, and more efficient utilization of communication resources.

Figure 7:
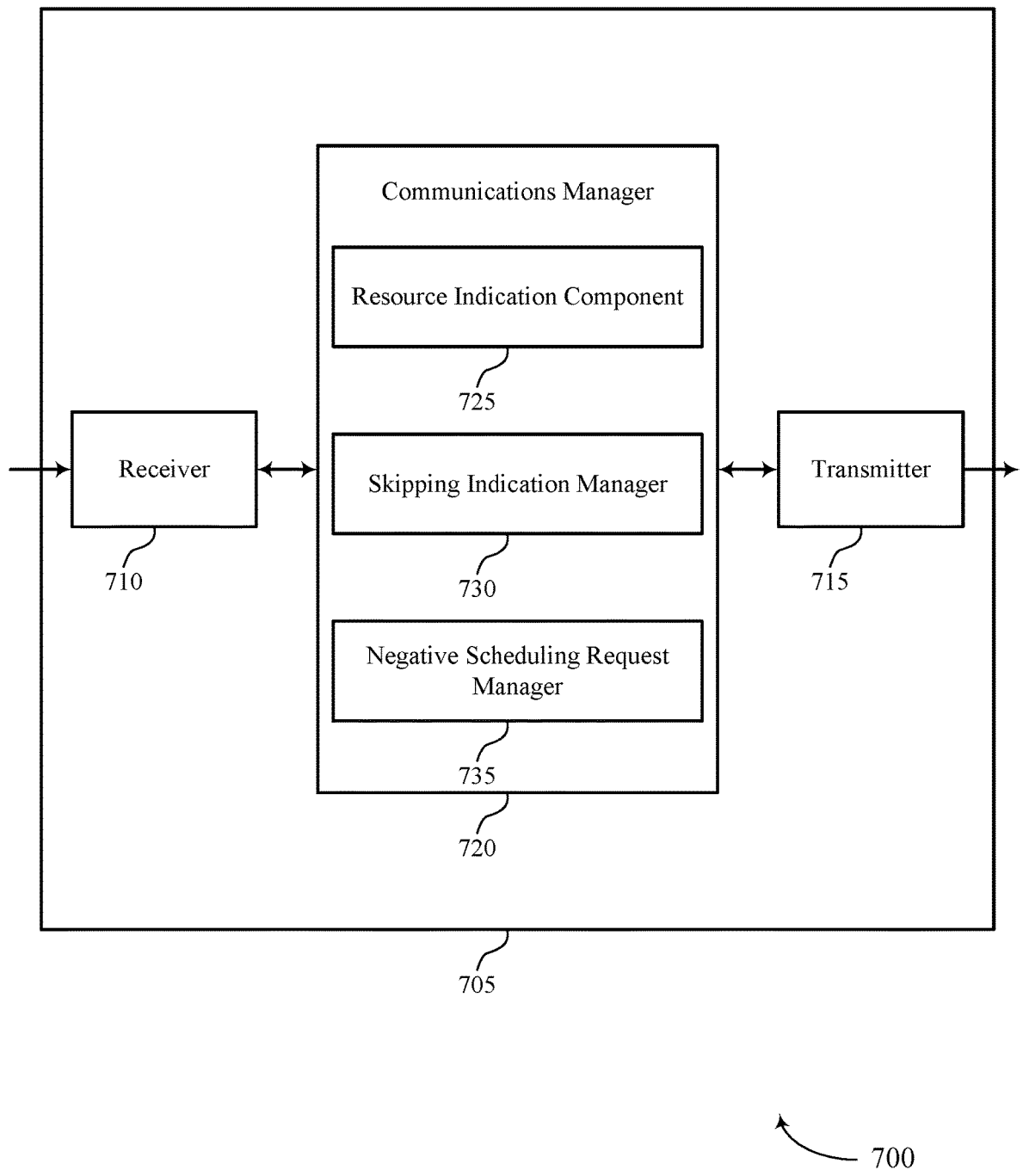

FIG. 7 shows a block diagram 700 of a device 705 that supports sidelink configured grant skipping in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink configured grant skipping). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink configured grant skipping). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sidelink configured grant skipping as described herein. For example, the communications manager 720 may include a resource indication component 725, a skipping indication manager 730, a negative scheduling request manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The resource indication component 725 may be configured as or otherwise support a means for receiving, from a base station, an indication of periodic data resources for a set of multiple sidelink data transmissions and an indication of negative scheduling request resources for the UE to report a skipped sidelink data transmission associated with the set of multiple sidelink data transmissions. The skipping indication manager 730 may be configured as or otherwise support a means for transmitting, to a second UE, an indication of the skipped sidelink data transmission. The negative scheduling request manager 735 may be configured as or otherwise support a means for transmitting, to the base station, a negative scheduling request using the negative scheduling request resources, where the negative scheduling request reports the skipped data transmission associated with the set of multiple sidelink data transmissions.

Figure 8:
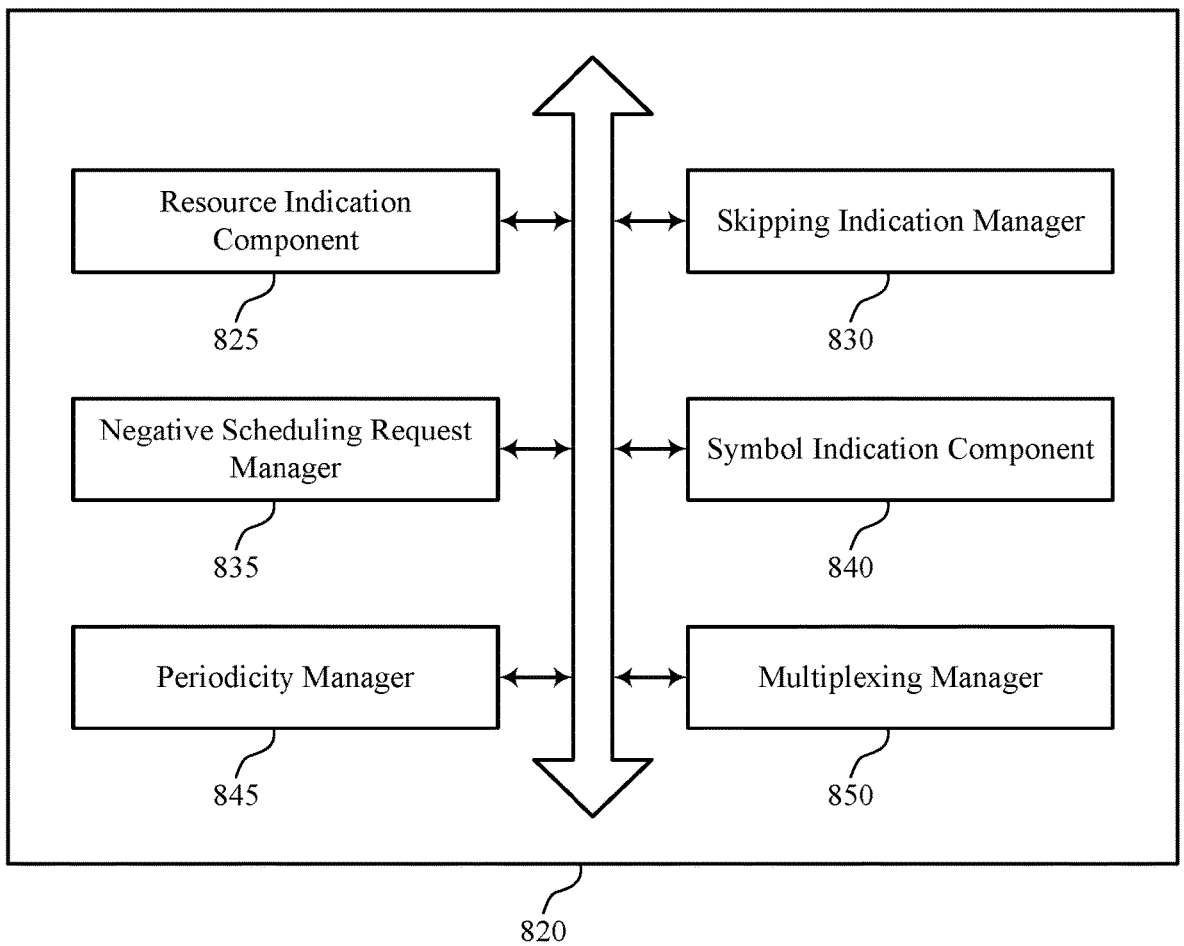
FIG. 8 shows a block diagram of a communications manager that supports sidelink configured grant skipping in accordance with aspects of the present disclosure.

FIG. 8 shows a block diagram 800 of a communications manager 820 that supports sidelink configured grant skipping in accordance with aspects of the present disclosure. The communications manager 820 may be an example of aspects of a communications manager 620, a communications manager 720, or both, as described herein. The communications manager 820, or various components thereof, may be an example of means for performing various aspects of sidelink configured grant skipping as described herein. For example, the communications manager 820 may include a resource indication component 825, a skipping indication manager 830, a negative scheduling request manager 835, a symbol indication component 840, a periodicity manager 845, a multiplexing manager 850, or any combination thereof. Each of these components may communicate, directly or indirectly, with one another (e.g., via one or more buses).

The communications manager 820 may support wireless communication at a first UE in accordance with examples as disclosed herein. The resource indication component 825 may be configured as or otherwise support a means for receiving, from a base station, an indication of periodic data resources for a set of multiple sidelink data transmissions and an indication of negative scheduling request resources for the UE to report a skipped sidelink data transmission associated with the set of multiple sidelink data transmissions. The skipping indication manager 830 may be configured as or otherwise support a means for transmitting, to a second UE, an indication of the skipped sidelink data transmission. The negative scheduling request manager 835 may be configured as or otherwise support a means for transmitting, to the base station, a negative scheduling request using the negative scheduling request resources, where the negative scheduling request reports the skipped data transmission associated with the set of multiple sidelink data transmissions.

In some examples, to support receiving the indication of the negative scheduling request resources, the symbol indication component 840 may be configured as or otherwise support a means for receiving, from the base station, an indication of a number of symbols between the negative scheduling request resource and the skipped sidelink data transmission of the set of multiple sidelink data transmissions.

In some examples, to support receiving the indication of the negative scheduling request resources, the periodicity manager 845 may be configured as or otherwise support a means for receiving, from the base station, an indication of a periodicity associated with the negative scheduling request resources.

In some examples, the periodicity associated with the negative scheduling request resources is an integer multiple of a periodicity associated with the sidelink data transmissions.

In some examples, the negative scheduling request specifies a set of multiple skipped data transmissions. In some examples, a numerical quantity of the set of multiple skipped data transmissions is based on a periodicity associated with the sidelink data transmissions.

In some examples, to support receiving the indication of the negative scheduling request resources, the resource indication component 825 may be configured as or otherwise support a means for receiving, from the base station, an indication of a PUCCH resource for transmitting an acknowledgement or a negative acknowledgement of one or more sidelink data transmissions of the set of multiple sidelink data transmissions.

In some examples, to support transmitting the negative scheduling request, the multiplexing manager 850 may be configured as or otherwise support a means for multiplexing the negative scheduling request with the acknowledgement or the negative acknowledgement of the one or more sidelink data transmissions in the PUCCH resource.

In some examples, to support multiplexing the negative scheduling request with the acknowledgment or the negative acknowledgment of the one or more sidelink data transmissions, the multiplexing manager 850 may be configured as or otherwise support a means for transmitting a PUCCH payload in the PUCCH resource, the PUCCH payload including a first number of bits for the acknowledgement or the negative acknowledgement and a second number of bits for a sidelink data transmission skipping indication.

In some examples, the indication of the skipped sidelink data transmission further indicates a skipping of one or more additional sidelink data transmissions subsequent to the skipped sidelink data transmission.

In some examples, the indication of the skipped sidelink data transmission indicates a skipping pattern for a group of sidelink data transmissions of the set of multiple sidelink data transmissions.

In some examples, the skipping indication manager 830 may be configured as or otherwise support a means for SCI, a sidelink MAC CE message, RRC signaling, or a combination thereof. In some examples, the indication of the skipped sidelink data transmission includes stage one sidelink control information, stage two sidelink control information, or both.

Figure 9:
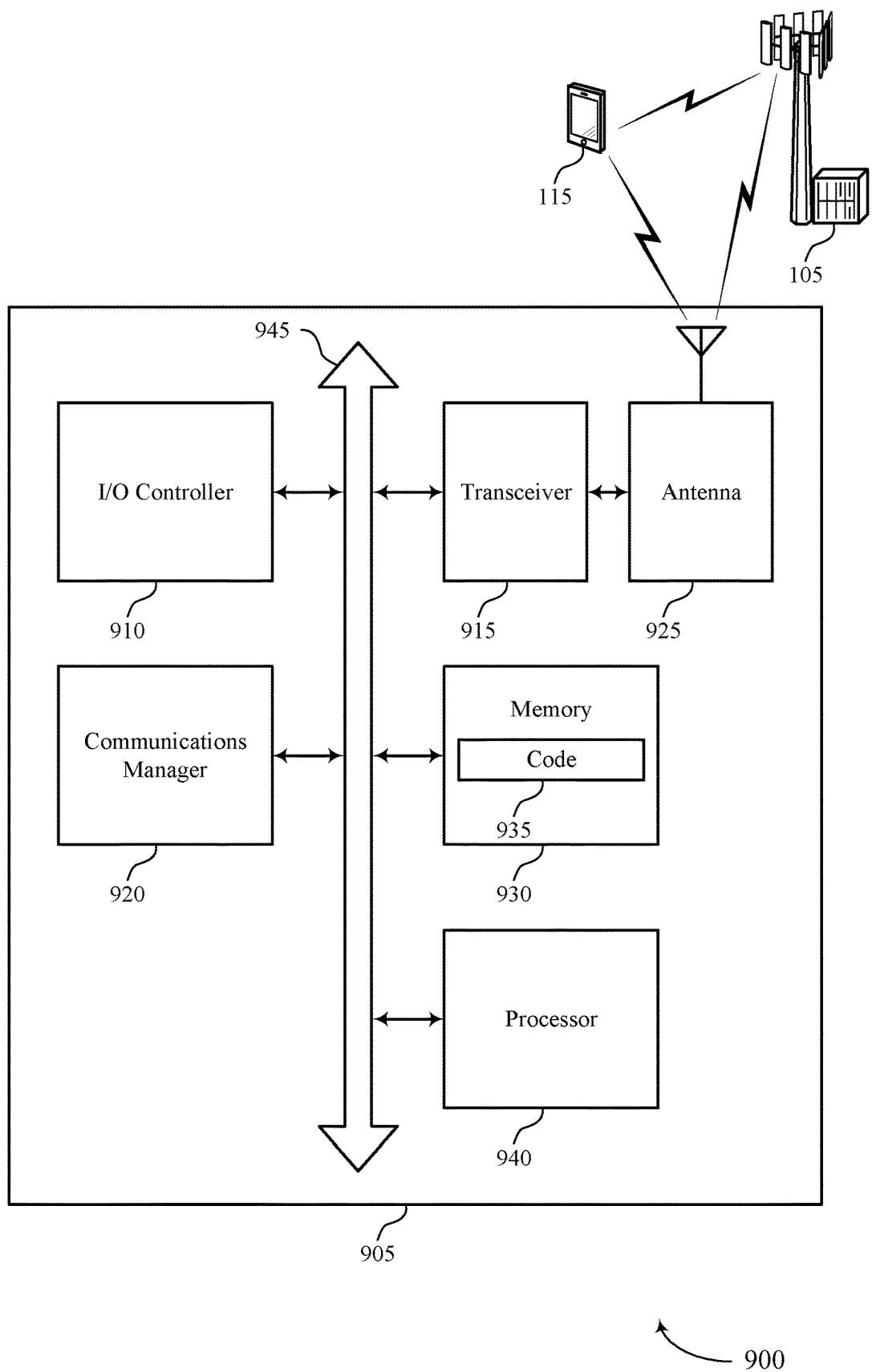
FIG. 9 shows a diagram of a system including a device that supports sidelink configured grant skipping in accordance with aspects of the present disclosure.

FIG. 9 shows a diagram of a system 900 including a device 905 that supports sidelink configured grant skipping in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink configured grant skipping). For example, the device 905 or a component of the device 905 may include a processor 940 and memory 930 coupled with or to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving, from a base station, an indication of periodic data resources for a set of multiple sidelink data transmissions and an indication of negative scheduling request resources for the UE to report a skipped sidelink data transmission associated with the set of multiple sidelink data transmissions. The communications manager 920 may be configured as or otherwise support a means for transmitting, to a second UE, an indication of the skipped sidelink data transmission. The communications manager 920 may be configured as or otherwise support a means for transmitting, to the base station, a negative scheduling request using the negative scheduling request resources, where the negative scheduling request reports the skipped data transmission associated with the set of multiple sidelink data transmissions.

By including or configuring the communications manager 920 in accordance with examples as described herein, the device 905 may support techniques for sidelink configured grant skipping, resulting in a mitigation of resource over-provisioning, more efficient utilization of communication resources, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sidelink configured grant skipping as described herein, or the processor 940 and the memory 930 may be otherwise configured to perform or support such operations.

Figure 10:
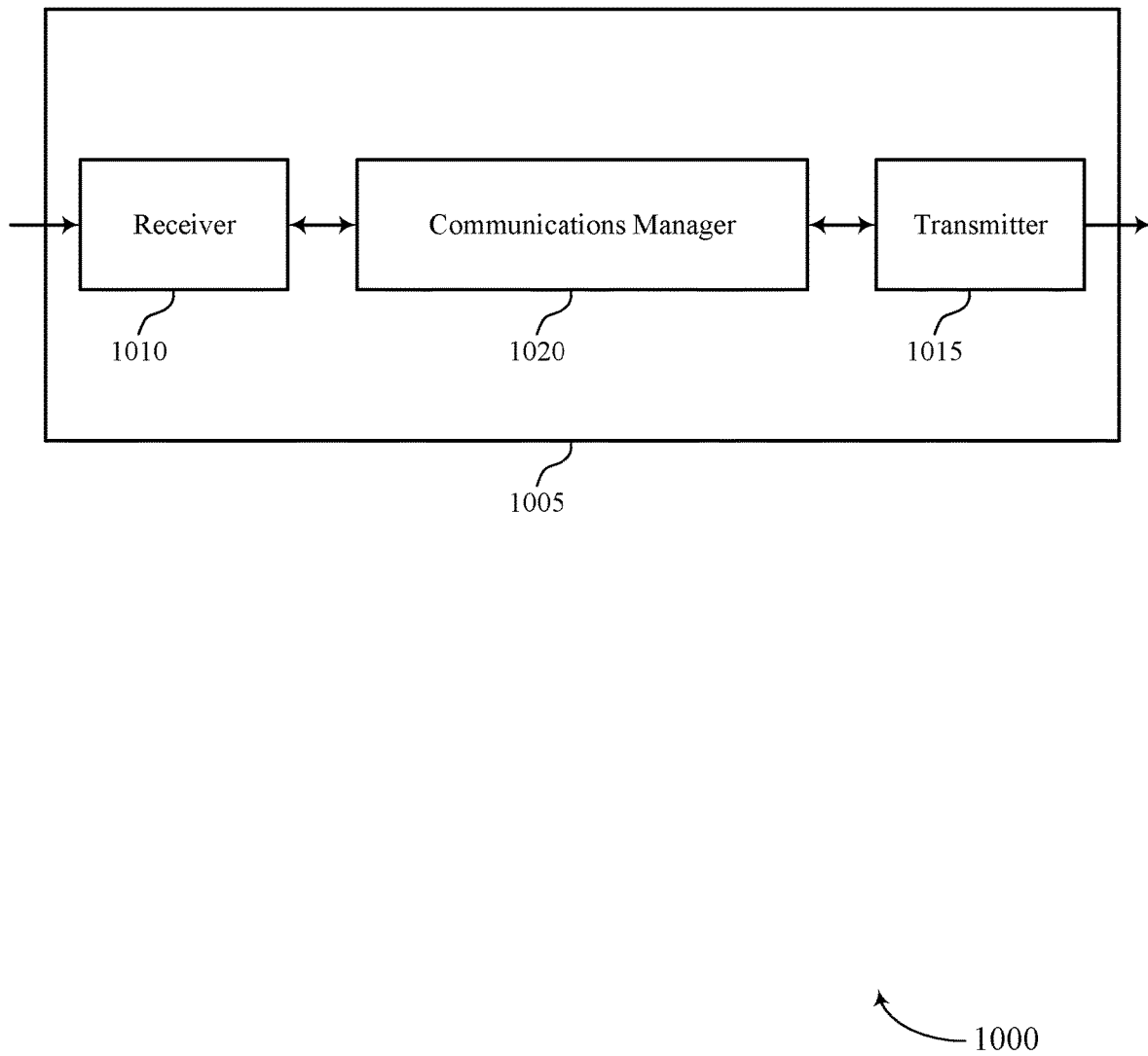
FIGS. 10 and 11 show block diagrams of devices that support sidelink configured grant skipping in accordance with aspects of the present disclosure.

FIG. 10 shows a block diagram 1000 of a device 1005 that supports sidelink configured grant skipping in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to sidelink configured grant skipping). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to sidelink configured grant skipping). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of sidelink configured grant skipping as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, an indication of periodic data resources for a set of multiple sidelink data transmissions and an indication of negative scheduling request resources for the UE to report a skipped sidelink data transmission associated with the sidelink data transmissions. The communications manager 1020 may be configured as or otherwise support a means for receiving, from the UE, a negative scheduling request using the negative scheduling resources, where the negative scheduling request reports the skipped data transmission associated with the set of multiple sidelink data transmissions.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for sidelink configured grant skipping, resulting in a mitigation of resource overprovisioning, reduced processing, and more efficient utilization of communication resources.

Figure 11:
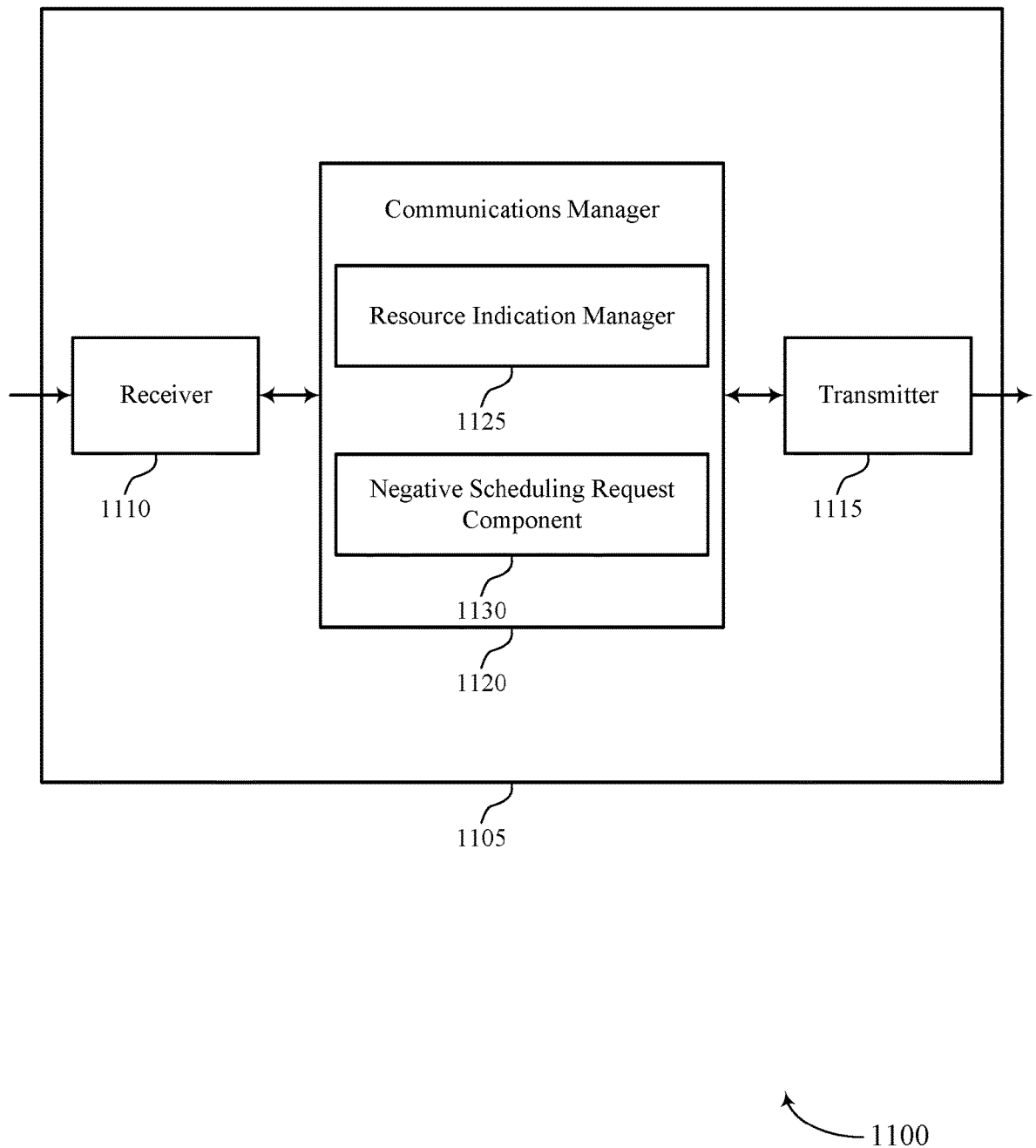

FIG. 11 shows a block diagram 1100 of a device 1105 that supports sidelink configured grant skipping in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to sidelink configured grant skipping). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to sidelink configured grant skipping). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of sidelink configured grant skipping as described herein. For example, the communications manager 1120 may include a resource indication manager 1125 a negative scheduling request component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The resource indication manager 1125 may be configured as or otherwise support a means for transmitting, to a UE, an indication of periodic data resources for a set of multiple sidelink data transmissions and an indication of negative scheduling request resources for the UE to report a skipped sidelink data transmission associated with the sidelink data transmissions. The negative scheduling request component 1130 may be configured as or otherwise support a means for receiving, from the UE, a negative scheduling request using the negative scheduling resources, where the negative scheduling request reports the skipped data transmission associated with the set of multiple sidelink data transmissions.

Figure 12:
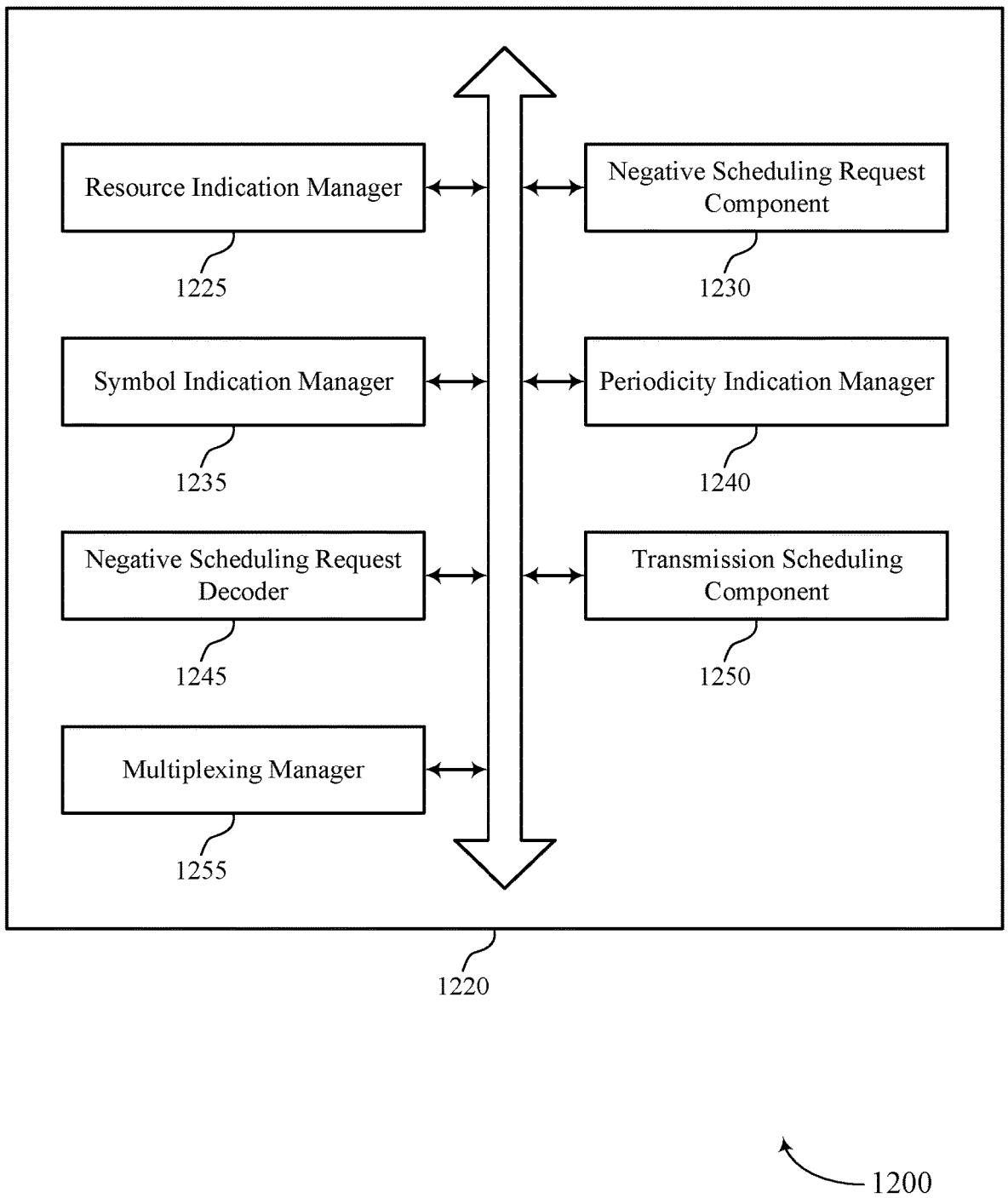
FIG. 12 shows a block diagram of a communications manager that supports sidelink configured grant skipping in accordance with aspects of the present disclosure.

FIG. 12 shows a block diagram 1200 of a communications manager 1220 that supports sidelink configured grant skipping in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of sidelink configured grant skipping as described herein. For example, the communications manager 1220 may include a resource indication manager 1225, a negative scheduling request component 1230, a symbol indication manager 1235, a periodicity indication manager 1240, a negative scheduling request decoder 1245, a transmission scheduling component 1250, a multiplexing manager 1255, or any combination thereof. Each of these components may communicate, directly or indirectly, with one another (e.g., via one or more buses).

The communications manager 1220 may support wireless communication at a base station in accordance with examples as disclosed herein. The resource indication manager 1225 may be configured as or otherwise support a means for transmitting, to a UE, an indication of periodic data resources for a set of multiple sidelink data transmissions and an indication of negative scheduling request resources for the UE to report a skipped sidelink data transmission associated with the sidelink data transmissions. The negative scheduling request component 1230 may be configured as or otherwise support a means for receiving, from the UE, a negative scheduling request using the negative scheduling resources, where the negative scheduling request reports the skipped data transmission associated with the set of multiple sidelink data transmissions.

In some examples, to support transmitting the indication of the negative scheduling request resources, the symbol indication manager 1235 may be configured as or otherwise support a means for transmitting, to the UE, an indication of a number of symbols between a negative scheduling request resource and a corresponding sidelink data transmission.

In some examples, the number of symbols between the negative scheduling request resource and the corresponding sidelink data transmission corresponds to a decoding time at the base station associated with processing the negative scheduling request.

In some examples, to support transmitting the indication of the negative scheduling request resources, the periodicity indication manager 1240 may be configured as or otherwise support a means for transmitting, to the UE, an indication of a periodicity associated with negative scheduling request resources.

In some examples, the periodicity associated with negative scheduling resources request is an integer multiple of a periodicity associated with sidelink data transmissions.

In some examples, the negative scheduling request specifies a set of multiple skipped data transmissions. In some examples, a numerical quantity of the set of multiple skipped data transmissions is based on a periodicity associated with the sidelink data transmissions.

In some examples, to support transmitting the indication of the negative scheduling request resources, the resource indication manager 1225 may be configured as or otherwise support a means for transmitting, to the UE, an indication of a PUCCH resource for transmitting an acknowledgement or a negative acknowledgement of one or more sidelink data transmissions of the set of multiple sidelink data transmissions.

In some examples, to support receiving the negative scheduling request, the multiplexing manager 1255 may be configured as or otherwise support a means for multiplexing the negative scheduling request with the acknowledgement or the negative acknowledgement of the one or more sidelink data transmissions in the PUCCH resource.

In some examples, to support multiplexing the negative scheduling request with the acknowledgement or the negative acknowledgement of the one or more sidelink data transmissions, the multiplexing manager 1255 may be configured as or otherwise support a means for receiving a PUCCH payload in the PUCCH resource, the PUCCH payload including a first number of bits for the acknowledgement or the negative acknowledgement and a second number of bits for a sidelink data transmission skipping indication.

In some examples, the negative scheduling request decoder 1245 may be configured as or otherwise support a means for decoding the negative scheduling request. In some examples, the transmission scheduling component 1250 may be configured as or otherwise support a means for scheduling other transmissions during instances corresponding to skipped data transmissions.

Figure 13:
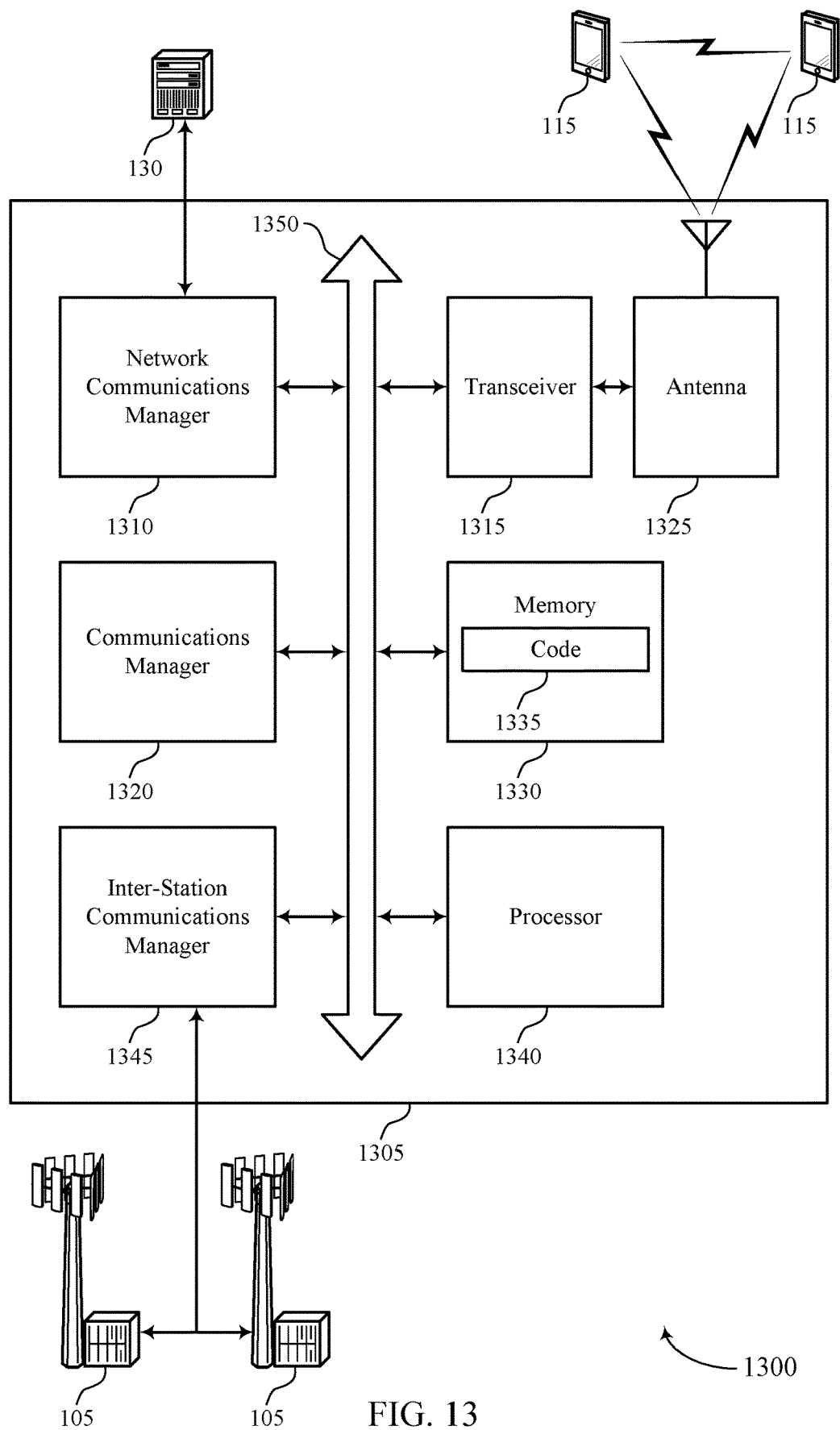
FIG. 13 shows a diagram of a system including a device that supports sidelink configured grant skipping in accordance with aspects of the present disclosure.

FIG. 13 shows a diagram of a system 1300 including a device 1305 that supports sidelink configured grant skipping in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting sidelink configured grant skipping). For example, the device 1305 or a component of the device 1305 may include a processor 1340 and memory 1330 coupled with or to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, an indication of periodic data resources for a set of multiple sidelink data transmissions and an indication of negative scheduling request resources for the UE to report a skipped sidelink data transmission associated with the sidelink data transmissions. The communications manager 1320 may be configured as or otherwise support a means for receiving, from the UE, a negative scheduling request using the negative scheduling resources, where the negative scheduling request reports the skipped data transmission associated with the set of multiple sidelink data transmissions.

By including or configuring the communications manager 1320 in accordance with examples as described herein, the device 1305 may support techniques for sidelink configured grant skipping, resulting in a mitigation of resource over-provisioning, more efficient utilization of communication resources, improved coordination between devices, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of sidelink configured grant skipping as described herein, or the processor 1340 and the memory 1330 may be otherwise configured to perform or support such operations.

Figure 14:
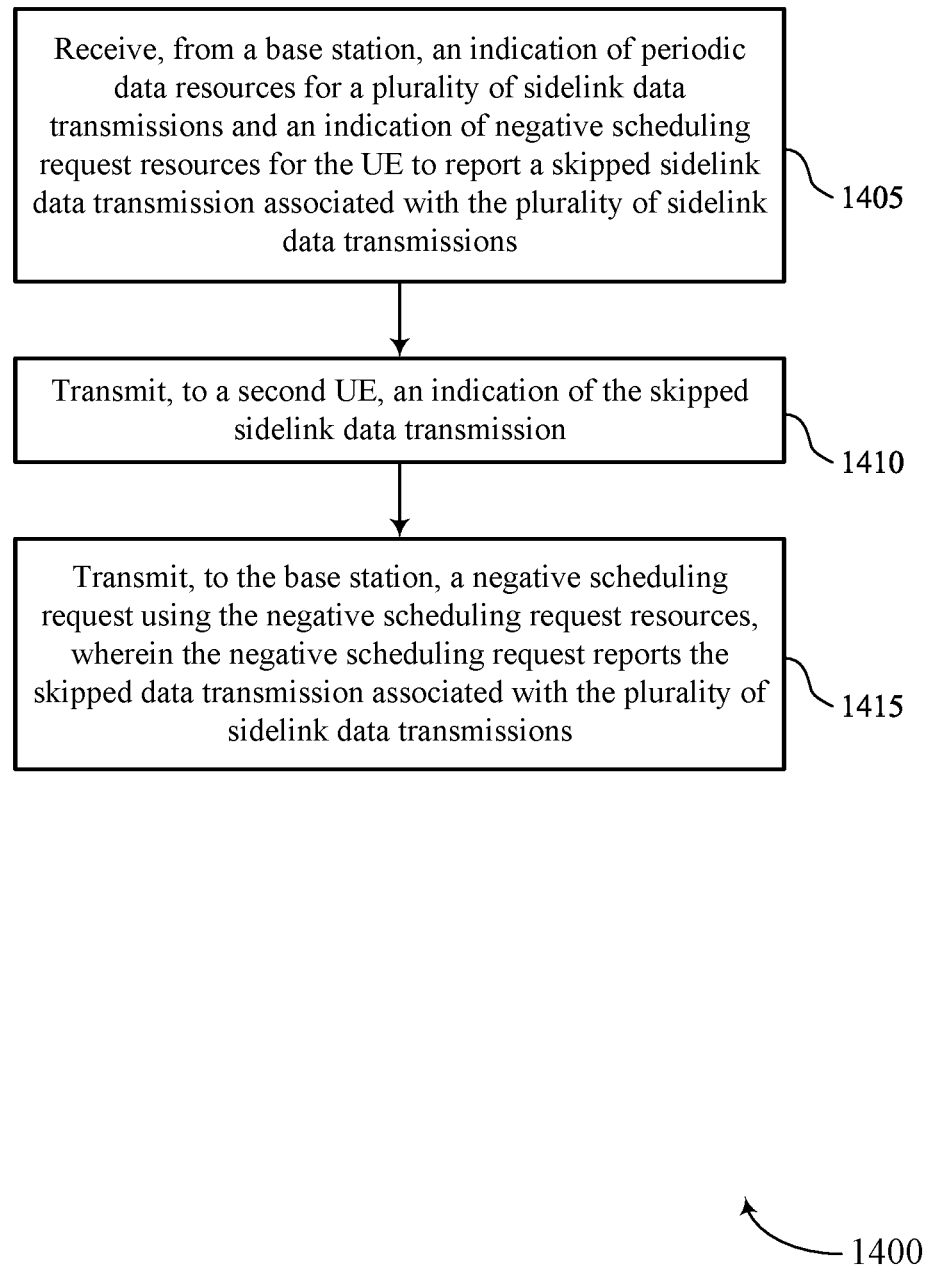
FIGS. 14 through 18 show flowcharts illustrating methods that support sidelink configured grant skipping in accordance with aspects of the present disclosure.

FIG. 14 shows a flowchart illustrating a method 1400 that supports sidelink configured grant skipping in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of periodic data resources for a set of multiple sidelink data transmissions and an indication of negative scheduling request resources for the UE to report a skipped sidelink data transmission associated with the set of multiple sidelink data transmissions. The operations of 1405 may be performed in accordance with examples as disclosed herein. In some examples, aspects of the operations of 1405 may be performed by a resource indication component 825 as described with reference to FIG. 8.

At 1410, the method may include transmitting, to a second UE, an indication of the skipped sidelink data transmission. The operations of 1410 may be performed in accordance with examples as disclosed herein. In some examples, aspects of the operations of 1410 may be performed by a skipping indication manager 830 as described with reference to FIG. 8.

At 1415, the method may include transmitting, to the base station, a negative scheduling request using the negative scheduling request resources, where the negative scheduling request reports the skipped data transmission associated with the set of multiple sidelink data transmissions. The operations of 1415 may be performed in accordance with examples as disclosed herein. In some examples, aspects of the operations of 1415 may be performed by a negative scheduling request manager 835 as described with reference to FIG. 8.

Figure 15:
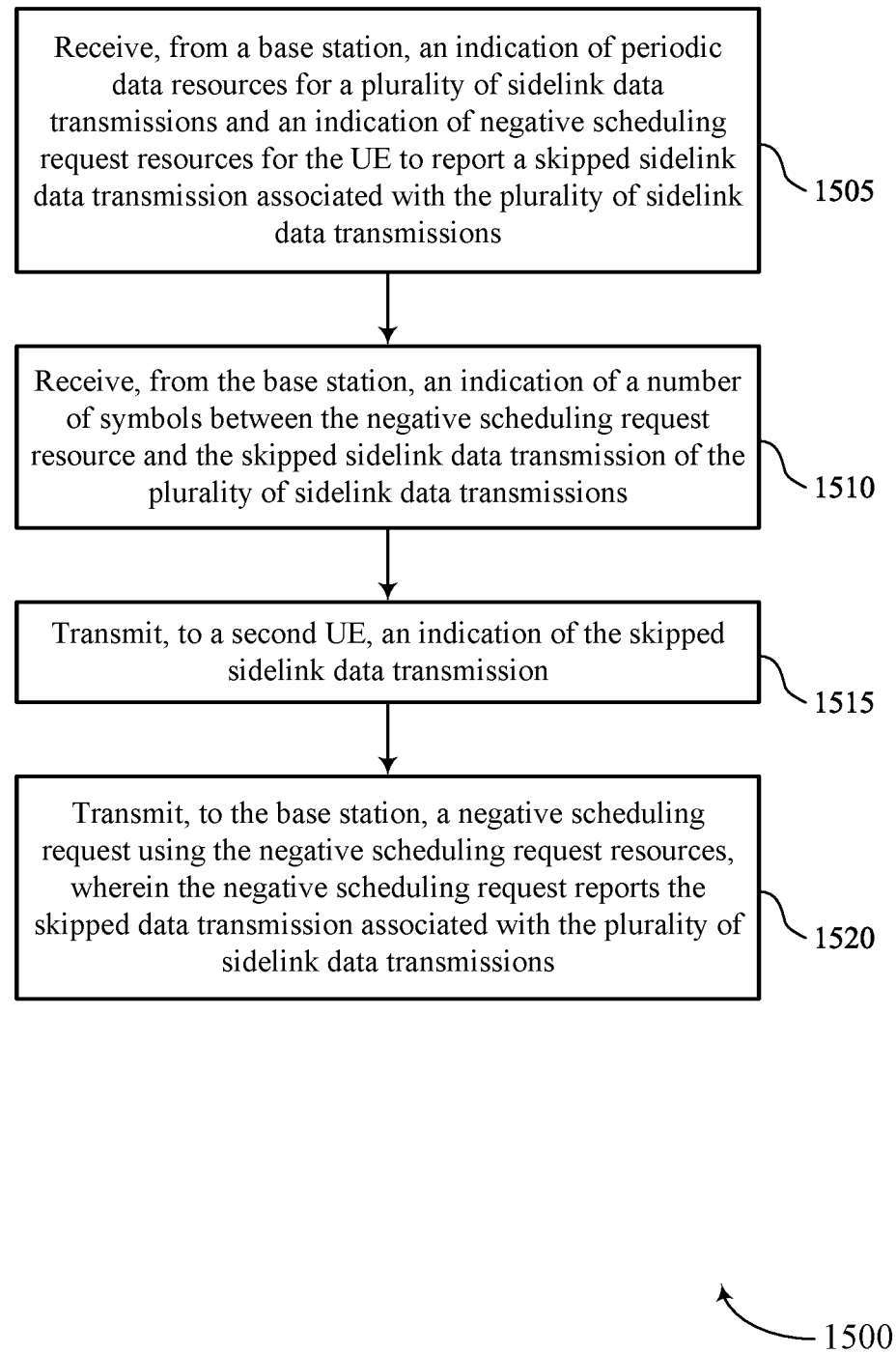

FIG. 15 shows a flowchart illustrating a method 1500 that supports sidelink configured grant skipping in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication of periodic data resources for a set of multiple sidelink data transmissions and an indication of negative scheduling request resources for the UE to report a skipped sidelink data transmission associated with the set of multiple sidelink data transmissions. The operations of 1505 may be performed in accordance with examples as disclosed herein. In some examples, aspects of the operations of 1505 may be performed by a resource indication component 825 as described with reference to FIG. 8.

At 1510, the method may include receiving, from the base station, an indication of a number of symbols between the negative scheduling request resource and the skipped sidelink data transmission of the set of multiple sidelink data transmissions. The operations of 1510 may be performed in accordance with examples as disclosed herein. In some examples, aspects of the operations of 1510 may be performed by a symbol indication component 840 as described with reference to FIG. 8.

At 1515, the method may include transmitting, to a second UE, an indication of the skipped sidelink data transmission. The operations of 1515 may be performed in accordance with examples as disclosed herein. In some examples, aspects of the operations of 1515 may be performed by a skipping indication manager 830 as described with reference to FIG. 8.

At 1520, the method may include transmitting, to the base station, a negative scheduling request using the negative scheduling request resources, where the negative scheduling request reports the skipped data transmission associated with the set of multiple sidelink data transmissions. The operations of 1520 may be performed in accordance with examples as disclosed herein. In some examples, aspects of the operations of 1520 may be performed by a negative scheduling request manager 835 as described with reference to FIG. 8.

Figure 16:
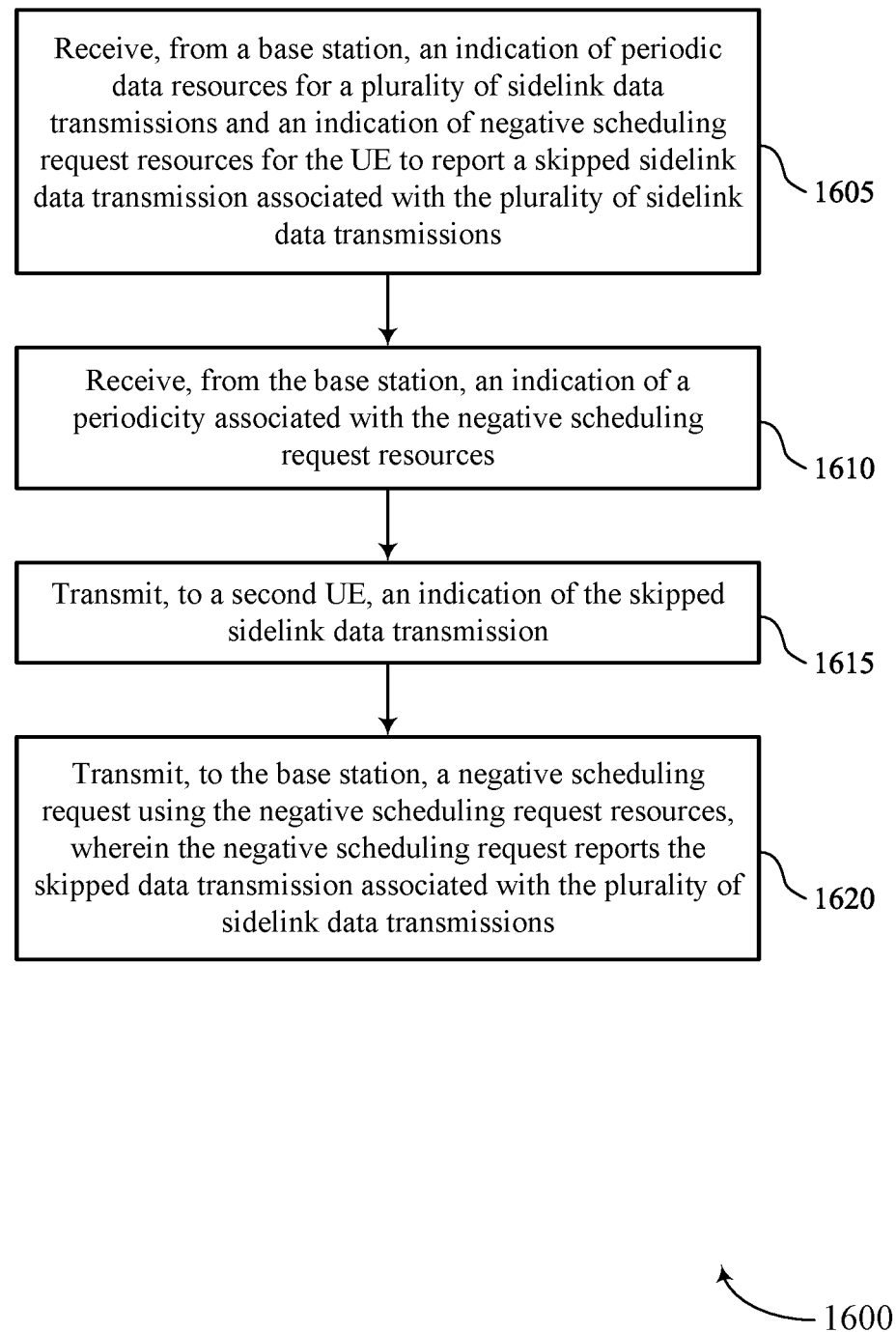

FIG. 16 shows a flowchart illustrating a method 1600 that supports sidelink configured grant skipping in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, an indication of periodic data resources for a set of multiple sidelink data transmissions and an indication of negative scheduling request resources for the UE to report a skipped sidelink data transmission associated with the set of multiple sidelink data transmissions. The operations of 1605 may be performed in accordance with examples as disclosed herein. In some examples, aspects of the operations of 1605 may be performed by a resource indication component 825 as described with reference to FIG. 8.

At 1610, the method may include receiving, from the base station, an indication of a periodicity associated with the negative scheduling request resources. The operations of 1610 may be performed in accordance with examples as disclosed herein. In some examples, aspects of the operations of 1610 may be performed by a periodicity manager 845 as described with reference to FIG. 8.

At 1615, the method may include transmitting, to a second UE, an indication of the skipped sidelink data transmission. The operations of 1615 may be performed in accordance with examples as disclosed herein. In some examples, aspects of the operations of 1615 may be performed by a skipping indication manager 830 as described with reference to FIG. 8.

At 1620, the method may include transmitting, to the base station, a negative scheduling request using the negative scheduling request resources, where the negative scheduling request reports the skipped data transmission associated with the set of multiple sidelink data transmissions. The operations of 1620 may be performed in accordance with examples as disclosed herein. In some examples, aspects of the operations of 1620 may be performed by a negative scheduling request manager 835 as described with reference to FIG. 8.

Figure 17:
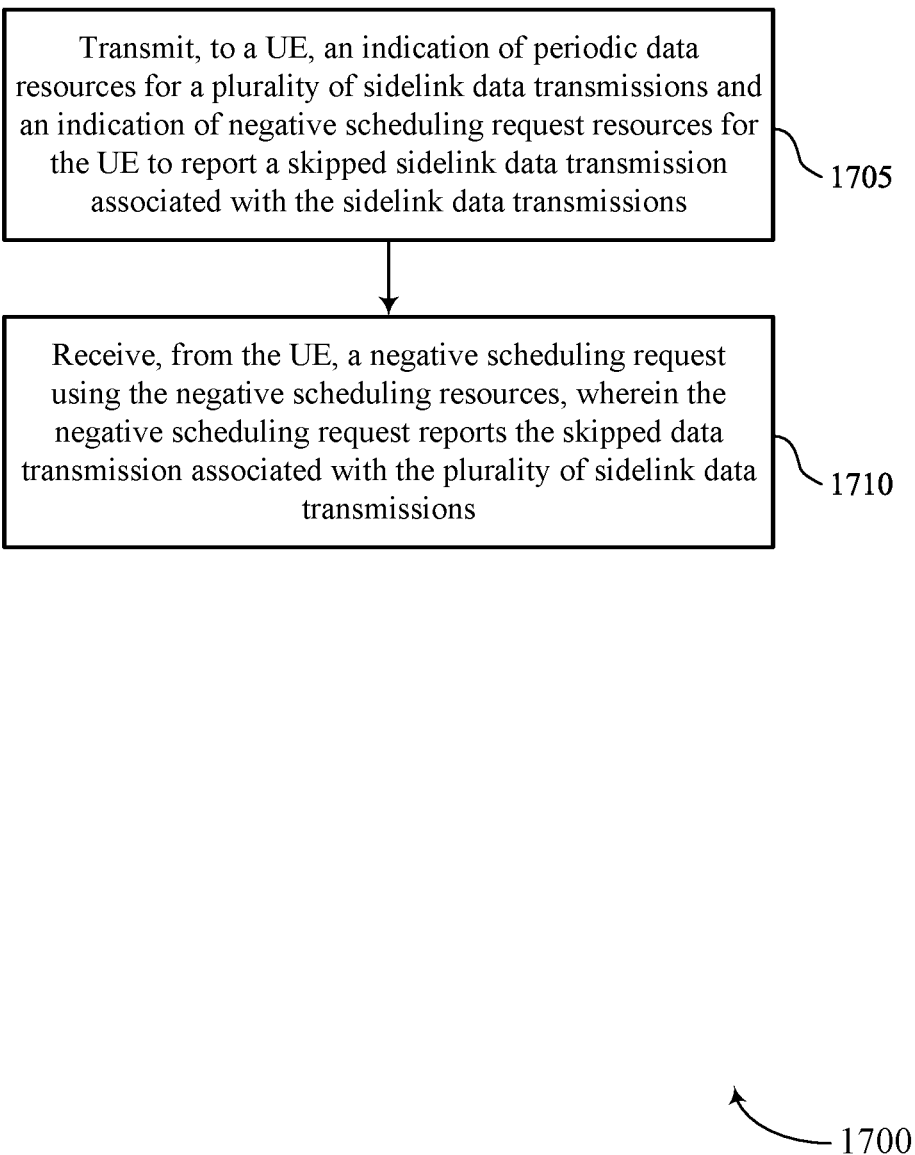

FIG. 17 shows a flowchart illustrating a method 1700 that supports sidelink configured grant skipping in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication of periodic data resources for a set of multiple sidelink data transmissions and an indication of negative scheduling request resources for the UE to report a skipped sidelink data transmission associated with the sidelink data transmissions. The operations of 1705 may be performed in accordance with examples as disclosed herein. In some examples, aspects of the operations of 1705 may be performed by a resource indication manager 1225 as described with reference to FIG. 12.

At 1710, the method may include receiving, from the UE, a negative scheduling request using the negative scheduling resources, where the negative scheduling request reports the skipped data transmission associated with the set of multiple sidelink data transmissions. The operations of 1710 may be performed in accordance with examples as disclosed herein. In some examples, aspects of the operations of 1710 may be performed by a negative scheduling request component 1230 as described with reference to FIG. 12.

Figure 18:
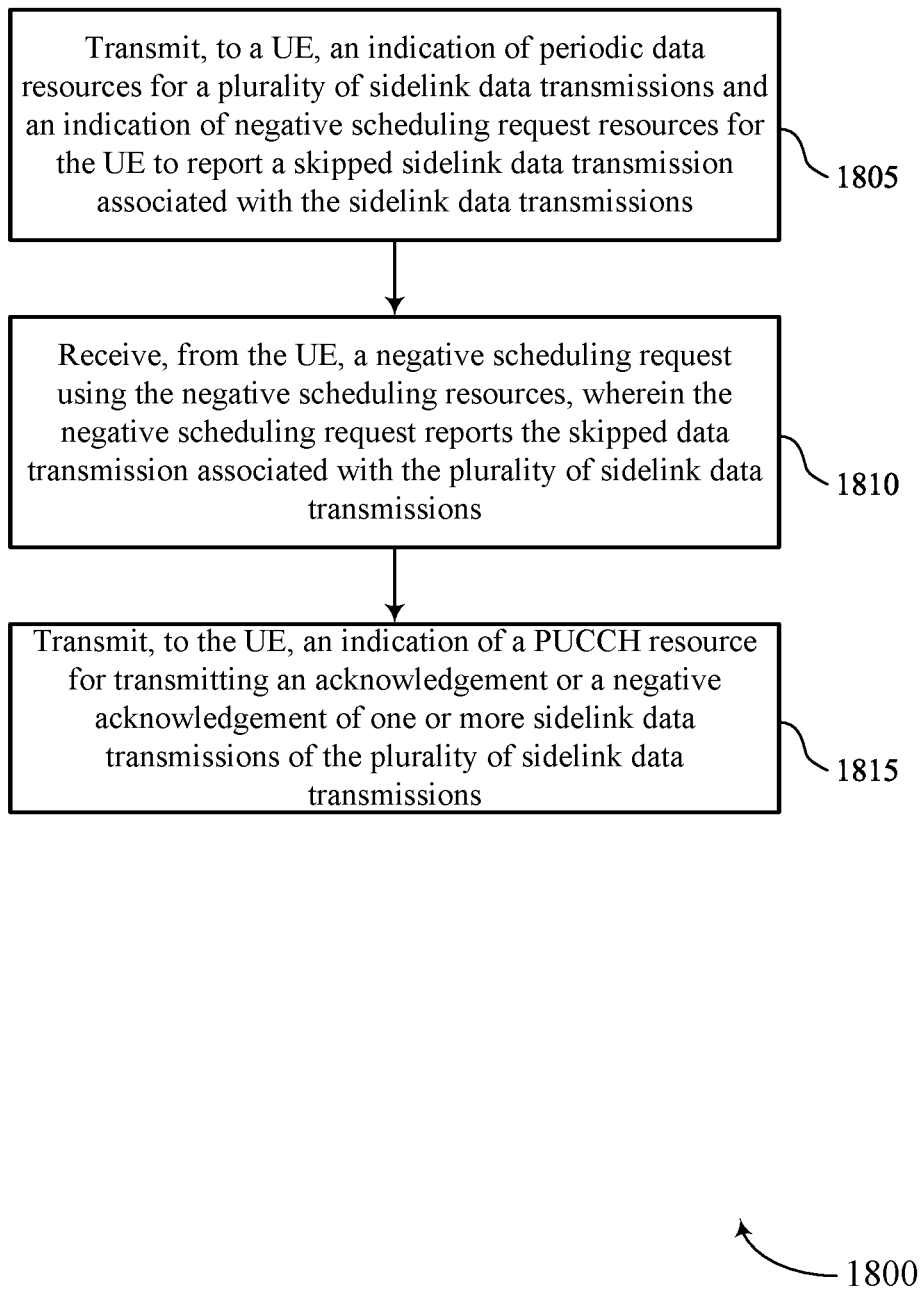

FIG. 18 shows a flowchart illustrating a method 1800 that supports sidelink configured grant skipping in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an indication of periodic data resources for a set of multiple sidelink data transmissions and an indication of negative scheduling request resources for the UE to report a skipped sidelink data transmission associated with the sidelink data transmissions. The operations of 1805 may be performed in accordance with examples as disclosed herein. In some examples, aspects of the operations of 1805 may be performed by a resource indication manager 1225 as described with reference to FIG. 12.

At 1810, the method may include receiving, from the UE, a negative scheduling request using the negative scheduling resources, where the negative scheduling request reports the skipped data transmission associated with the set of multiple sidelink data transmissions. The operations of 1810 may be performed in accordance with examples as disclosed herein. In some examples, aspects of the operations of 1810 may be performed by a negative scheduling request component 1230 as described with reference to FIG. 12.

At 1815, the method may include transmitting, to the UE, an indication of a PUCCH resource for transmitting an acknowledgement or a negative acknowledgement of one or more sidelink data transmissions of the set of multiple sidelink data transmissions. The operations of 1815 may be performed in accordance with examples as disclosed herein. In some examples, aspects of the operations of 1815 may be performed by a resource indication manager 1225 as described with reference to FIG. 12.

The following provides an overview of aspects of the present disclosure:

Aspect 1: A method for wireless communication at a first UE, comprising: receiving, from a base station, an indication of periodic data resources for a plurality of sidelink data transmissions and an indication of negative scheduling request resources for the UE to report a skipped sidelink data transmission associated with the plurality of sidelink data transmissions; transmitting, to a second UE, an indication of the skipped sidelink data transmission; and transmitting, to the base station, a negative scheduling request using the negative scheduling request resources, wherein the negative scheduling request reports the skipped data transmission associated with the plurality of sidelink data transmissions.

Aspect 2: The method of aspect 1, wherein receiving the indication of the negative scheduling request resources comprises: receiving, from the base station, an indication of a number of symbols between the negative scheduling request resource and the skipped sidelink data transmission of the plurality of sidelink data transmissions.

Aspect 3: The method of any of aspects 1 through 2, wherein receiving the indication of the negative scheduling request resources comprises: receiving, from the base station, an indication of a periodicity associated with the negative scheduling request resources.

Aspect 4: The method of aspect 3, wherein the periodicity associated with the negative scheduling request resources is an integer multiple of a periodicity associated with the sidelink data transmissions.

Aspect 5: The method of any of aspects 1 through 4, wherein the negative scheduling request specifies a plurality of skipped data transmissions, and a numerical quantity of the plurality of skipped data transmissions is based at least in part on a periodicity associated with the sidelink data transmissions.

Aspect 6: The method of any of aspects 1 through 5, wherein receiving the indication of the negative scheduling request resources comprises: receiving, from the base station, an indication of a PUCCH resource for transmitting an acknowledgement or a negative acknowledgement of one or more sidelink data transmissions of the plurality of sidelink data transmissions.

Aspect 7: The method of aspect 6, wherein transmitting the negative scheduling request comprises: multiplexing the negative scheduling request with the acknowledgement or the negative acknowledgement of the one or more sidelink data transmissions in the PUCCH resource.

Aspect 8: The method of aspect 7, wherein multiplexing the negative scheduling request with the acknowledgment or the negative acknowledgment of the one or more sidelink data transmissions comprises: transmitting a PUCCH payload in the PUCCH resource, the PUCCH payload including a first number of bits for the acknowledgement or the negative acknowledgement and a second number of bits for a sidelink data transmission skipping indication.

Aspect 9: The method of any of aspects 1 through 8, wherein the indication of the skipped sidelink data transmission further indicates a skipping of one or more additional sidelink data transmissions subsequent to the skipped sidelink data transmission.

Aspect 10: The method of any of aspects 1 through 9, wherein the indication of the skipped sidelink data transmission indicates a skipping pattern for a group of sidelink data transmissions of the plurality of sidelink data transmissions.

Aspect 11: The method of any of aspects 1 through 10, wherein the indication of the skipped sidelink data transmission comprises one or more of: sidelink control information, a sidelink medium access control (MAC) control element (CE) message, RRC signaling, or a combination thereof.

Aspect 12: The method of aspect 11, wherein the indication of the skipped sidelink data transmission comprises stage one sidelink control information, stage two sidelink control information, or both.

Aspect 13: A method for wireless communication at a base station, comprising: transmitting, to a UE, an indication of periodic data resources for a plurality of sidelink data transmissions and an indication of negative scheduling request resources for the UE to report a skipped sidelink data transmission associated with the sidelink data transmissions; and receiving, from the UE, a negative scheduling request using the negative scheduling resources, wherein the negative scheduling request reports the skipped data transmission associated with the plurality of sidelink data transmissions.

Aspect 14: The method of aspect 13, wherein transmitting the indication of the negative scheduling request resources comprises: transmitting, to the UE, an indication of a number of symbols between a negative scheduling request resource and a corresponding sidelink data transmission.

Aspect 15: The method of aspect 14, wherein the number of symbols between the negative scheduling request resource and the corresponding sidelink data transmission corresponds to a decoding time at the base station associated with processing the negative scheduling request.

Aspect 16: The method of any of aspects 13 through 15, wherein transmitting the indication of the negative scheduling request resources comprises: transmitting, to the UE, an indication of a periodicity associated with negative scheduling request resources.

Aspect 17: The method of aspect 16, wherein the periodicity associated with negative scheduling resources request is an integer multiple of a periodicity associated with sidelink data transmissions.

Aspect 18: The method of any of aspects 13 through 17, wherein the negative scheduling request specifies a plurality of skipped data transmissions, and a numerical quantity of the plurality of skipped data transmissions is based at least in part on a periodicity associated with the sidelink data transmissions.

Aspect 19: The method of any of aspects 13 through 18, wherein transmitting the indication of the negative scheduling request resources comprises: transmitting, to the UE, an indication of a PUCCH resource for transmitting an acknowledgement or a negative acknowledgement of one or more sidelink data transmissions of the plurality of sidelink data transmissions.

Aspect 20: The method of aspect 19, wherein receiving the negative scheduling request comprises: multiplexing the negative scheduling request with the acknowledgement or the negative acknowledgement of the one or more sidelink data transmissions in the PUCCH resource.

Aspect 21: The method of aspect 20, wherein multiplexing the negative scheduling request with the acknowledgement or the negative acknowledgement of the one or more sidelink data transmissions comprises: receiving a PUCCH payload in the PUCCH resource, the PUCCH payload including a first number of bits for the acknowledgement or the negative acknowledgement and a second number of bits for a sidelink data transmission skipping indication.

Aspect 22: The method of any of aspects 13 through 21, further comprising: decoding the negative scheduling request; and scheduling other transmissions during instances corresponding to skipped data transmissions.

Aspect 23: An apparatus for wireless communication at a first UE, comprising a processor; memory coupled with the processor; and instructions stored in the memory and executable by the processor to cause the apparatus to perform a method of any of aspects 1 through 12.

Aspect 24: An apparatus for wireless communication at a first UE, comprising at least one means for performing a method of any of aspects 1 through 12.

Aspect 25: A non-transitory computer-readable medium storing code for wireless communication at a first UE, the code comprising instructions executable by a processor to perform a method of any of aspects 1 through 12.

Aspect 26: An apparatus for wireless communication at a base station, comprising a processor; memory coupled with the processor; and instructions stored in the memory and executable by the processor to cause the apparatus to perform a method of any of aspects 13 through 22.

Aspect 27: An apparatus for wireless communication at a base station, comprising at least one means for performing a method of any of aspects 13 through 22.

Aspect 28: A non-transitory computer-readable medium storing code for wireless communication at a base station, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    a processor;
    memory coupled with the processor; and
    instructions stored in the memory and executable by the processor to cause the apparatus to:
        receive, from a base station, an indication of periodic data resources for a plurality of sidelink data transmissions and an indication of negative scheduling request resources for the UE to report a skipped sidelink data transmission associated with the plurality of sidelink data transmissions;
        transmit, to a second UE, an indication of the skipped sidelink data transmission; and
        transmit, to the base station, a negative scheduling request using the negative scheduling request resources, wherein the negative scheduling request reports the skipped data transmission associated with the plurality of sidelink data transmissions.

2. The apparatus of claim 1, wherein the instructions to receive the indication of the negative scheduling request resources are executable by the processor to cause the apparatus to:
    receive, from the base station, an indication of a number of symbols between the negative scheduling request resource and the skipped sidelink data transmission of the plurality of sidelink data transmissions.

3. The apparatus of claim 1, wherein the instructions to receive the indication of the negative scheduling request resources are executable by the processor to cause the apparatus to:
    receive, from the base station, an indication of a periodicity associated with the negative scheduling request resources.

4. The apparatus of claim 3, wherein the periodicity associated with the negative scheduling request resources is an integer multiple of a periodicity associated with the sidelink data transmissions.

5. The apparatus of claim 1, wherein:
    the negative scheduling request specifies a plurality of skipped data transmissions, and
    a numerical quantity of the plurality of skipped data transmissions is based at least in part on a periodicity associated with the sidelink data transmissions.

6. The apparatus of claim 1, wherein the instructions to receive the indication of the negative scheduling request resources are executable by the processor to cause the apparatus to:
    receive, from the base station, an indication of a physical uplink control channel (PUCCH) resource for transmitting an acknowledgement or a negative acknowledgement of one or more sidelink data transmissions of the plurality of sidelink data transmissions.

7. The apparatus of claim 6, wherein the instructions to transmit the negative scheduling request are executable by the processor to cause the apparatus to:
    multiplex the negative scheduling request with the acknowledgement or the negative acknowledgement of the one or more sidelink data transmissions in the PUCCH resource.

8. The apparatus of claim 7, wherein the instructions to multiplex the negative scheduling request with the acknowledgment or the negative acknowledgment of the one or more sidelink data transmissions are executable by the processor to cause the apparatus to:
    transmit a PUCCH payload in the PUCCH resource, the PUCCH payload including a first number of bits for the acknowledgement or the negative acknowledgement and a second number of bits for a sidelink data transmission skipping indication.

9. The apparatus of claim 1, wherein the indication of the skipped sidelink data transmission further indicates a skipping of one or more additional sidelink data transmissions subsequent to the skipped sidelink data transmission.

10. The apparatus of claim 1, wherein the indication of the skipped sidelink data transmission indicates a skipping pattern for a group of sidelink data transmissions of the plurality of sidelink data transmissions.

11. The apparatus of claim 1, wherein the instructions to are executable by the processor to cause the apparatus to:
    sidelink control information, a sidelink medium access control (MAC) control element (CE) message, radio resource control (RRC) signaling, or a combination thereof.

12. The apparatus of claim 11, wherein the indication of the skipped sidelink data transmission comprises stage one sidelink control information, stage two sidelink control information, or both.

13. An apparatus for wireless communication at a base station, comprising:
a processor;
memory coupled with the processor; and
instructions stored in the memory and executable by the processor to cause the apparatus to:
transmit, to a user equipment (UE), an indication of periodic data resources for a plurality of sidelink data transmissions and an indication of negative scheduling request resources for the UE to report a skipped sidelink data transmission associated with the sidelink data transmissions; and
receive, from the UE, a negative scheduling request using the negative scheduling resources, wherein the negative scheduling request reports the skipped data transmission associated with the plurality of sidelink data transmissions.

14. The apparatus of claim 13, wherein the instructions to transmit the indication of the negative scheduling request resources are executable by the processor to cause the apparatus to:
transmit, to the UE, an indication of a number of symbols between a negative scheduling request resource and a corresponding sidelink data transmission.

15. The apparatus of claim 14, wherein the number of symbols between the negative scheduling request resource and the corresponding sidelink data transmission corresponds to a decoding time at the base station associated with processing the negative scheduling request.

16. The apparatus of claim 13, wherein the instructions to transmit the indication of the negative scheduling request resources are executable by the processor to cause the apparatus to:
transmit, to the UE, an indication of a periodicity associated with negative scheduling request resources.

17. The apparatus of claim 16, wherein the periodicity associated with negative scheduling resources request is an integer multiple of a periodicity associated with sidelink data transmissions.

18. The apparatus of claim 13, wherein:
the negative scheduling request specifies a plurality of skipped data transmissions, and
a numerical quantity of the plurality of skipped data transmissions is based at least in part on a periodicity associated with the sidelink data transmissions.

19. The apparatus of claim 13, wherein the instructions to transmit the indication of the negative scheduling request resources are executable by the processor to cause the apparatus to:
transmit, to the UE, an indication of a physical uplink control channel (PUCCH) resource for transmitting an acknowledgement or a negative acknowledgment of one or more sidelink data transmissions of the plurality of sidelink data transmissions.

20. The apparatus of claim 19, wherein the instructions to receive the negative scheduling request are executable by the processor to cause the apparatus to:
multiplex the negative scheduling request with the acknowledgement or the negative acknowledgement of the one or more sidelink data transmissions in the PUCCH resource.

21. The apparatus of claim 20, wherein the instructions to multiplex the negative scheduling request with the acknowledgement or the negative acknowledgement of the one or more sidelink data transmissions are executable by the processor to cause the apparatus to:
receive a PUCCH payload in the PUCCH resource, the PUCCH payload including a first number of bits for the acknowledgement or the negative acknowledgement and a second number of bits for a sidelink data transmission skipping indication.

22. The apparatus of claim 13, wherein the instructions are further executable by the processor to cause the apparatus to:
decode the negative scheduling request; and
schedule other transmissions during instances corresponding to skipped data transmissions.

23. A method for wireless communication at a first user equipment (UE), comprising:
receiving, from a base station, an indication of periodic data resources for a plurality of sidelink data transmissions and an indication of negative scheduling request resources for the UE to report a skipped sidelink data transmission associated with the plurality of sidelink data transmissions;
transmitting, to a second UE, an indication of the skipped sidelink data transmission; and
transmitting, to the base station, a negative scheduling request using the negative scheduling request resources, wherein the negative scheduling request reports the skipped data transmission associated with the plurality of sidelink data transmissions.

24. The method of claim 23, wherein receiving the indication of the negative scheduling request resources comprises:
receiving, from the base station, an indication of a number of symbols between the negative scheduling request resource and the skipped sidelink data transmission of the plurality of sidelink data transmissions.

25. The method of claim 23, wherein receiving the indication of the negative scheduling request resources comprises:
receiving, from the base station, an indication of a periodicity associated with the negative scheduling request resources.

26. The method of claim 25, wherein the periodicity associated with the negative scheduling request resources is an integer multiple of a periodicity associated with the sidelink data transmissions.

27. A method for wireless communication at a base station, comprising:
transmitting, to a user equipment (UE), an indication of periodic data resources for a plurality of sidelink data transmissions and an indication of negative scheduling request resources for the UE to report a skipped sidelink data transmission associated with the sidelink data transmissions; and
receiving, from the UE, a negative scheduling request using the negative scheduling resources, wherein the negative scheduling request reports the skipped data transmission associated with the plurality of sidelink data transmissions.

28. The method of claim 27, wherein transmitting the indication of the negative scheduling request resources comprises:
transmitting, to the UE, an indication of a number of symbols between a negative scheduling request resource and a corresponding sidelink data transmission.

29. The method of claim 28, wherein the number of symbols between the negative scheduling request resource and the corresponding sidelink data transmission corresponds to a decoding time at the base station associated with processing the negative scheduling request.

30. The method of claim 27, wherein transmitting the indication of the negative scheduling request resources comprises:
   transmitting, to the UE, an indication of a periodicity associated with negative scheduling request resources.

* * * * *